United States Patent
Losaw

(10) Patent No.: US 8,308,125 B2
(45) Date of Patent: Nov. 13, 2012

(54) SELECTIVELY ADJUSTABLE DEVICE FOR SECURING A HANDBAG

(76) Inventor: Monte Roger Losaw, Littleton, CO (US)

(*) Notice: Subject to any disclaimer, the term of this patent is extended or adjusted under 35 U.S.C. 154(b) by 5 days.

(21) Appl. No.: 12/881,809

(22) Filed: Sep. 14, 2010

(65) Prior Publication Data

US 2011/0114806 A1    May 19, 2011

Related U.S. Application Data

(60) Provisional application No. 61/242,006, filed on Sep. 14, 2009, provisional application No. 61/288,163, filed on Dec. 18, 2009.

(51) Int. Cl.
*A47G 29/00*    (2006.01)

(52) U.S. Cl. .................. 248/690; 248/339; 248/914

(58) Field of Classification Search ............. 248/304, 248/305, 307, 308, 227.1, 227.2, 339, 914, 248/690, 225.21, 693; 24/343, 349, 546, 24/582.1, 582.11, 581.12, 592.11, 588.11, 24/592.1, 594.1, 600.1, 600.4, 600.9, 598.7, 24/598.8, 599.1, 599.2
See application file for complete search history.

(56) References Cited

U.S. PATENT DOCUMENTS

| | | | |
|---|---|---|---|
| 545,680 A * | 9/1895 | Colbert, Jr. .................. 278/96 |
| 1,386,894 A * | 8/1921 | Myrmo .................... 24/599.2 |
| 1,424,238 A * | 8/1922 | Cochran ................... 294/82.2 |
| 2,064,133 A | 12/1936 | Schroeder |
| 2,473,086 A | 6/1949 | Montero |
| 2,500,881 A | 3/1950 | Stader |
| 2,532,255 A * | 11/1950 | Davis ........................ 248/215 |
| 2,631,803 A | 3/1953 | Meyers |
| 3,207,463 A | 9/1965 | Downey |
| D229,870 S | 1/1974 | Czarny |
| 3,860,210 A | 1/1975 | Berardinelli et al. |
| D244,883 S | 6/1977 | Rohrmuller |
| 4,118,001 A * | 10/1978 | Serkez ....................... 248/308 |
| 4,139,667 A | 2/1979 | Blue |
| 4,194,714 A | 3/1980 | Schultz |
| D256,738 S | 9/1980 | Dockery |
| D275,527 S | 9/1984 | Gee |
| 4,621,851 A * | 11/1986 | Bailey, Jr. ................. 294/82.2 |
| D300,882 S | 5/1989 | Olson |
| 5,014,948 A | 5/1991 | Asaro et al. |
| 5,094,417 A | 3/1992 | Creed |
| 5,594,419 A | 1/1997 | Lo |

(Continued)

FOREIGN PATENT DOCUMENTS

FR    2731336 A1 *    9/1996

(Continued)

OTHER PUBLICATIONS

Notice of Allowability for U.S. Appl. No. 29/343,508, mailed Jun. 28, 2010.

(Continued)

*Primary Examiner* — Terrell McKinnon
*Assistant Examiner* — Eret McNichols
(74) *Attorney, Agent, or Firm* — Sheridan Ross P.C.

(57) ABSTRACT

A selectively adjustable device for securing a handbag on a table is provided. The device is designed to fold into a compact shape and includes at least one surface for receiving a handbag. Other embodiments provided include a secondary arm for allowing accommodation of the device onto a vertically oriented wall or other surface.

15 Claims, 28 Drawing Sheets

U.S. PATENT DOCUMENTS

| | | | |
|---|---|---|---|
| D384,505 S | 10/1997 | Stewart | |
| 5,743,451 A | 4/1998 | Kahn | |
| D429,899 S | 8/2000 | Schwartz | |
| D432,316 S | 10/2000 | Duggan | |
| D435,733 S | 1/2001 | Osterholt | |
| D443,135 S | 6/2001 | Marks et al. | |
| D452,610 S | 1/2002 | Schwartzmiller | |
| 6,345,796 B1 | 2/2002 | Neuman | |
| D462,172 S | 9/2002 | Aurelio | |
| 6,454,147 B1 | 9/2002 | Marks | |
| D467,159 S | 12/2002 | Meyer | |
| 6,830,055 B1 | 12/2004 | Frame et al. | |
| D505,545 S | 5/2005 | Kay | |
| D507,737 S | 7/2005 | Flanagan | |
| D517,732 S | 3/2006 | Osterholt | |
| 7,322,554 B2 * | 1/2008 | Caroselli et al. | 248/304 |
| 7,389,966 B1 * | 6/2008 | Hunter | 248/304 |
| 7,468,665 B2 * | 12/2008 | Grundy | 340/568.1 |
| D599,188 S * | 9/2009 | Ingalsbe et al. | D8/328 |
| D608,386 S | 1/2010 | Wright | |
| D612,158 S | 3/2010 | Lehr et al. | |
| D612,159 S | 3/2010 | Lehr et al. | |
| D626,344 S | 11/2010 | Losaw | |
| 7,837,171 B1 * | 11/2010 | Otake | 248/339 |
| D632,095 S | 2/2011 | Losaw | |
| 7,934,692 B2 * | 5/2011 | Brustein et al. | 248/683 |
| D642,450 S * | 8/2011 | Freese | D8/367 |
| 8,061,669 B2 * | 11/2011 | Yap et al. | 248/304 |
| 2003/0038220 A1 * | 2/2003 | Catan | 248/304 |
| 2003/0150889 A1 | 8/2003 | Caroselli et al. | |
| 2004/0103500 A1 | 6/2004 | Ward | |
| 2004/0195484 A1 | 10/2004 | Sheeran | |
| 2005/0056746 A1 * | 3/2005 | Landver | 248/227.1 |
| 2005/0161570 A1 * | 7/2005 | Bauerly | 248/317 |
| 2006/0108497 A1 * | 5/2006 | Miranda | 248/690 |
| 2007/0170329 A1 * | 7/2007 | Li | 248/304 |
| 2008/0005876 A1 | 1/2008 | Christianson | |

FOREIGN PATENT DOCUMENTS

| | | | |
|---|---|---|---|
| FR | 2861264 A1 * | 4/2005 | |
| GB | 2253998 A * | 9/1992 | |
| JP | 10113275 | 5/1998 | |

OTHER PUBLICATIONS

Notice of Allowability for U.S. Appl. No. 29/343,511, mailed Jul. 9, 2010.

International Search Report for International (PCT) Patent Application No. PCT/US2010/048766, mailed Oct. 25, 2010.

Written Opinion for International (PCT) Patent Application No. PCT/US2010/048766, mailed Oct. 25, 2010.

* cited by examiner

SELECTIVELY ADJUSTABLE DEVICE FOR SECURING A HANDBAG

This application claims the benefit of U.S. Provisional Patent Application Ser. No. 61/242,006, filed Sep. 14, 2009, and U.S. Provisional Patent Application Ser. No. 61/288,163, filed Dec. 18, 2009, the entire disclosures of which are incorporated herein.

FIELD OF THE INVENTION

Embodiments of the present invention are generally related to selectively adjustable devices having at least one hook adapted for securing a handbag. Additionally, one embodiment of the invention employs arms for selectively associating the device and associated handbags with a table or door.

BACKGROUND OF THE INVENTION

People who carry a purse, backpack, luggage, attaché, etc. (hereinafter "handbag") often have difficulty finding acceptable storage for the same at a restaurant, for example. More specifically, it is desirable to keep one's belongs in close proximity while dining to prevent or deter theft. One simple way to accomplish this goal is to place the handbag on the floor adjacent to one's chair, which may be undesirable as the often expensive handbag may be damaged or soiled. Alternatively, one may place their handbag on the table, which reduces space available for food and drinks. Some other individuals choose to dine with their handbags on their lap, which is cumbersome and uncomfortable.

Devices, also known as "hangers", for associating a handbag from a table are often foldable and stored within the handbag when not needed. Generally, foldable hangers include a member for engagement to a top surface of the table and a downwardly disposed hook that receives a strap or handle of the handbag such that the handbag rests underneath the table, out of view and off the floor.

The configuration of handbag hangers has not changed in a number of years, as evidenced by a comparison of U.S. Pat. Nos. D300,882 and 4,194,714 with U.S. Pat. Nos. D435,733, D517,732 and U.S. Patent Application Publication No. 2005/0161570, which are incorporated by reference herein. The handbag hangers of the prior art have many drawbacks in that they are not additionally equipped to engage a top edge of a vertical surface, for example, a door or wall of a bathroom stall. More specifically, often there is no convenient place to engage the handbag hangers of the prior art to a bathroom stall, which forces an individual to place their belongings on an often soiled and germ-ridden floor.

Thus it is a long felt need to provide a foldable device for selectively associating a handbag with a horizontal and/or vertical surface, such as a table and a door, respectively.

SUMMARY OF THE INVENTION

It is one aspect of the present invention to provide a selectively foldable device that secures a handbag and associates the same with a horizontal surface or vertical surface. More specifically, one embodiment of the present invention includes a table engagement portion and a hook wherein a handbag is hung beneath the table similar to that of traditional hangers described above. In addition, a selectively deployable door or auxiliary arm is provided that is used to associate the device with a door or wall of a bathroom stall. Embodiments of the present invention can be used by men, women or children and can remain interconnected to the handbag or stored when not in use. The various hooks of the inventions described herein may also be used to hang jackets, coats, hats, etc.

It is another aspect of some embodiments of the present invention to provide a handbag securing device comprised of a table portion that may be used as a handle. The other portion of the device normally used to receive a handbag is designed to receive at least one grocery bag to facilitate carrying the same. One skilled in the art will appreciate that embodiments of the present invention may include other features, which will be described below. Furthermore, the device shown below may be incorporated into a key chain and may be selectively associated to stroller or bike. The handbag hook described herein may also be used to attach the handbag to a shopping cart, to help prevent or deter theft. To that end, the device may employ a lock to help ensure the handbag remains secured to the device, cart, etc.

It is another aspect of some embodiments of the present invention to provide a foldable device that accommodates advertisements or logos. More specifically, one skilled in the art will appreciate that the devices shown in detail below may include various surfaces that are apt to employ advertising. In addition, the contemplated foldable device may be specifically shaped, colored, include two or three dimensional designs or indicia, employ unique surface textures, etc., i.e., customized to meet a desired feel.

It is another aspect of some embodiments of the present invention to provide a device with gripping members. More specifically, portions of the devices that are designed to engage horizontal or vertical surfaces may be made of a rigid material, such as metal. In order to enhance engagement of those portions to the horizontal/vertical surfaces, and to prevent damage thereto, rubber or any other compliant material may be provided on the engagement portions.

It is another aspect of embodiments of the present invention to provide a handbag securing device that accommodates at least one mirror. Furthermore, whistles, lights, weapons, mace, nail files, may also be incorporated into some embodiments of the present invention. An integrated clock, a makeup compact, etc. may be included. The device may also possess storage locations for pills. In one embodiment of the present invention, a garage or car door opener is integrated into the device. Other embodiments of the present invention include a money storage location. Some embodiments employ a GPS tracking system or the like so that parents can monitor a minor's whereabouts, emergency service personnel can be quickly notified of an injured person's whereabouts, a lost handbag may be located, or a lost individual can find their way home or be found. A location for an electronic data card, which may be selectively associated with a USB cord may be provided. Embodiments may also employ a USB port for interconnection with a digital media device, such as a flash drive. Other embodiments include an LED or other integrated screen. The device may thus be linked (via Blue Tooth, for example) to a computer, a wireless signal, a cellular phone, etc. to send/receive data. For example, one could discretely check weather, stock quotes, email notifications, voice mail notifications, etc. while sitting at a dinner table without having to access their cellular phone or computer.

It is yet another aspect of embodiments of the present invention to provide a device having an auxiliary arm that is selectively deflectable. More specifically, one embodiment of the present invention functions similar to a carabineer, wherein the auxiliary arm, which is used to associate the device to a top portion of a bathroom stall, for example, is able to selectively deflect. The auxiliary arm is separated into a first portion and a second portion that are hingedly interconnected and biased by a spring. For example, a leaf spring is employed that allows an extension protruding from the auxiliary arm to flex to facilitate receipt of a handbag onto the hook, which will be evident upon review of the figures provided herewith.

One embodiment of the present invention is fabricated from plastic or other lightweight material. This embodiment of the present invention is similar to those described above and will be understood more clearly upon review of the figures related to the same. An auxiliary arm is included that employs a capture hook that receives a capture ring that is rotatably interconnected to a hook that functions similar to a carabineer. The handbag hook is operably associated with a table arm by way of a pin. In operation, the hook is deflected upwardly to overcome a spring, which directs the capture ring along an inclined edge of an extension associated with the door arm. Deflection of the hook thus rotates the ring inwardly as it travels along the inclined edge. Once released, the spring forces the handbag hook downwardly, thereby positioning the capture ring away from the capture hook which allows for free rotation of the capture ring so that a handle of the handbag may be positioned on the hook. The capture ring may then be pulled towards the capture hook to allow seating of the capture ring on the capture hook to secure the handbag.

It is another aspect of the present invention to provide a selectively foldable device for securing a handbag, comprising: a primary hook having a first end, a second end, and having a portion adapted to receive the handbag; an auxiliary arm with a first portion operably interconnected to said primary hook and a second portion operably interconnected to said first portion; an extension with a first end interconnected to said second portion and a second end; a head operably interconnected to said first end of said primary hook, said head having a surface adapted to engage a horizontal surface; wherein in a first, folded position of use said auxiliary arm and said extension is positioned such that said second end of said gate is positioned adjacent to said second end of said primary hook; and wherein in a second position of use said surface of said head adapted to be engaged on a horizontal surface and said auxiliary arm and associated extension are positioned such that said second end of said primary hook and said second end of said gate are positioned away from each other so that said head may be adapted to be positioned on said horizontal surface and said second end is adapted to be positioned beneath said horizontal surface.

It is still yet another aspect of the present invention to provide a selectively foldable device for securing a handbag, comprising: a primary hook; an auxiliary arm associated to said primary hook, said auxiliary arm including an extension that selectively coincides with an end of said primary hook; and a head adapted to engage a horizontal surface associated with said primary hook.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
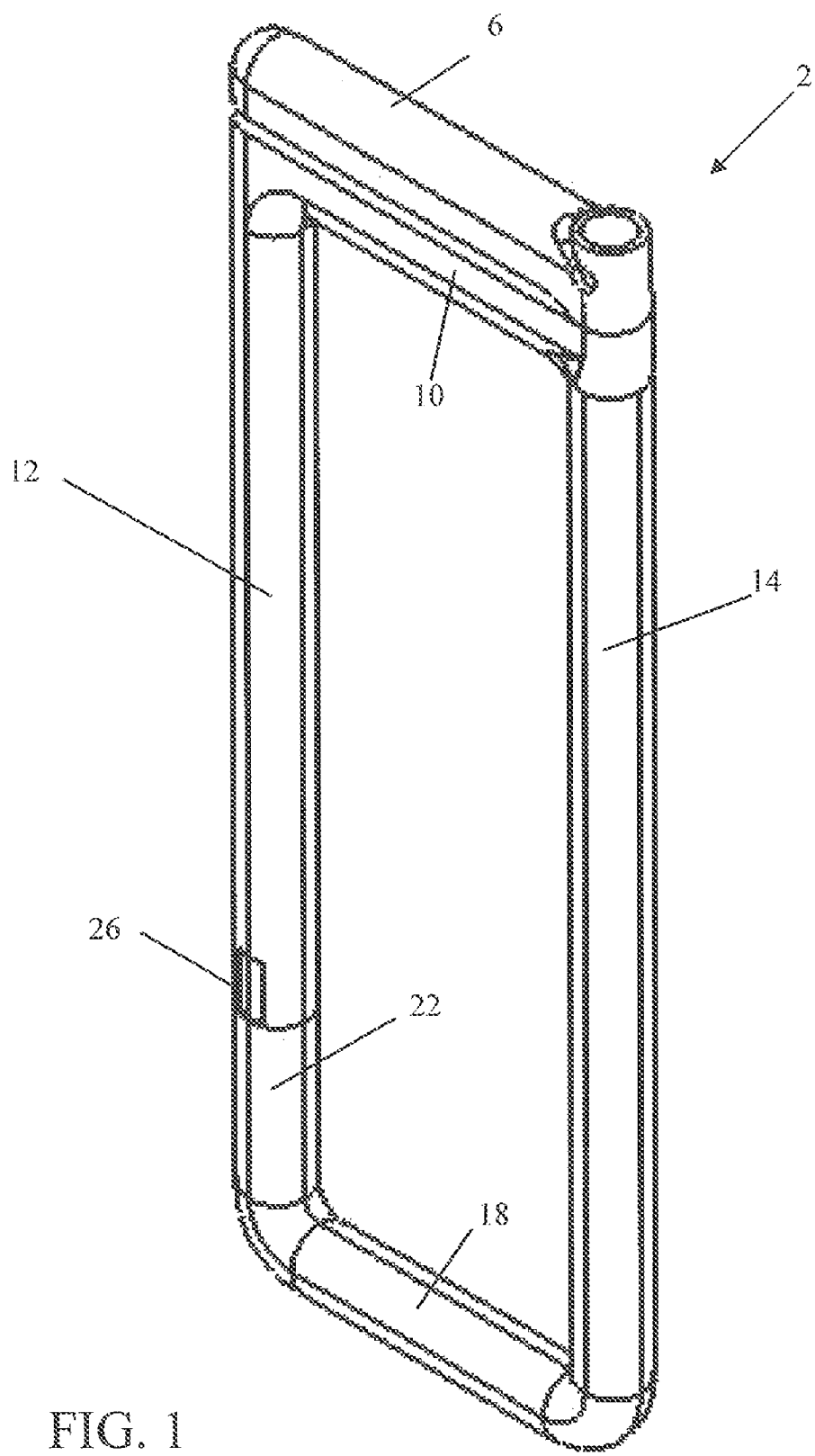
FIG. 1 is a perspective view of one embodiment of the present invention.
Figure 2:
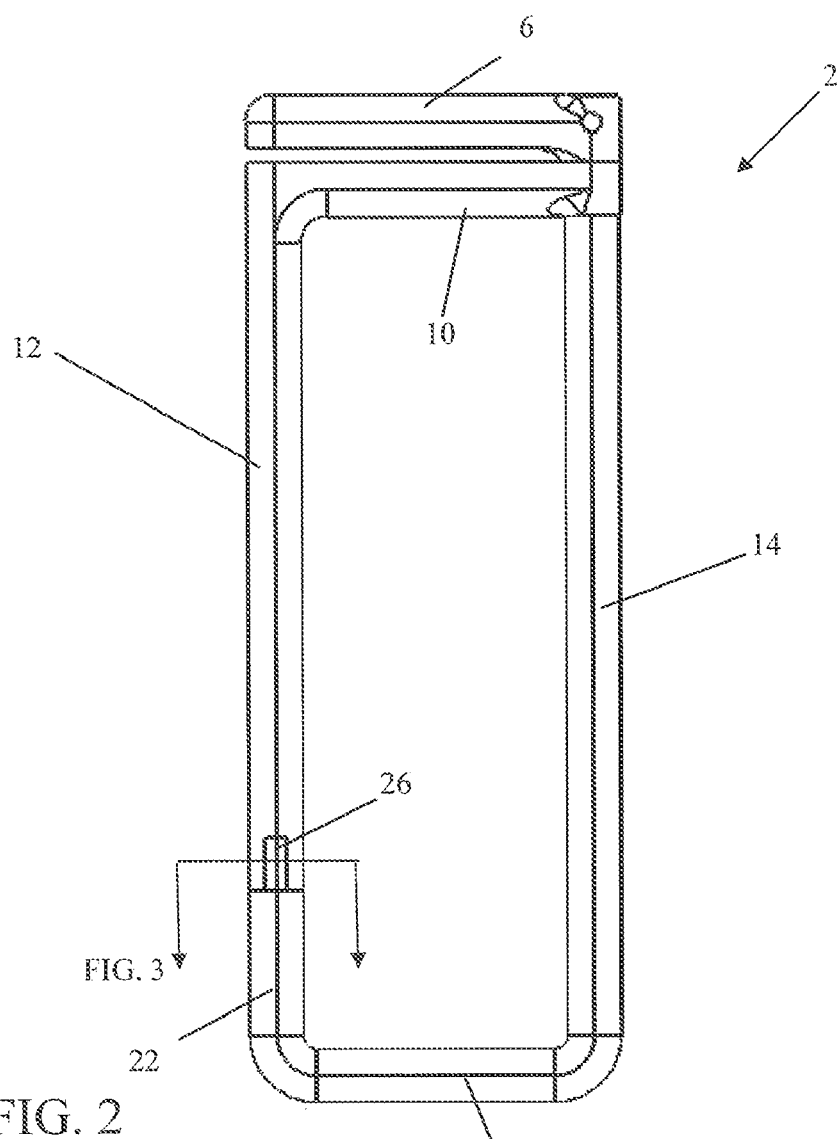
FIG. 2 is a front elevation view of FIG. 1.

To assist in the understanding of the present invention the following list of components and associated numbering found in the drawings is provided herein:

| # | Components |
|---|---|
| 2 | Handbag securing device |
| 6 | Table arm |
| 10 | Door arm |
| 12 | Extension |
| 14 | Post |
| 18 | Hook |
| 22 | Riser |
| 26 | Lock |
| 30 | Outer protrusion |
| 34 | Inner protrusion |
| 38 | Cavity |
| 42 | Appendage |
| 46 | Indent |
| 100 | Luggage tag |
| 104 | Sleeve |
| 108 | Door arm |
| 200 | Handbag securing device |
| 202 | Table portion |
| 206 | Hinge |
| 208 | Hanging purse portion |
| 212 | Hook |
| 216 | Door arm |
| 220 | Hinge |
| 300 | Handbag securing device |
| 304 | Head |
| 308 | Primary hook |
| 312 | Post |
| 316 | Groove |
| 320 | First surface |
| 324 | Recess |
| 328 | Second surface |
| 332 | Recess |
| 334 | Notch |
| 336 | Table |
| 340 | Handbag |
| 344 | Door arm |
| 346 | Extension |
| 348 | Wall |
| 352 | Hook end |
| 360 | Pin |
| 364 | Channel |
| 368 | Channel opening |
| 400 | Handbag securing device |
| 404 | Primary hook |
| 408 | Hook end |
| 412 | Linear portion |
| 414 | Post |
| 416 | Post arm |
| 420 | Door arm |
| 424 | Head |
| 428 | Spring |
| 432 | Notch |
| 434 | Extension |
| 440 | Spring |
| 444 | First portion |
| 448 | Second portion |
| 450 | Hinge |
| 454 | Plunger |
| 458 | First hole |

-continued

| # | Components |
|---|---|
| 462 | Second hole |
| 466 | Notch |
| 470 | Cavity |
| 474 | Groove |
| 478 | Channel |
| 482 | Sidewall |
| 600 | Handbag securing device |
| 604 | Door arm |
| 608 | Bore |
| 612 | Post |
| 616 | Spring |
| 620 | Capture hook |
| 622 | Extension |
| 624 | Table arm |
| 628 | Capture hook |
| 632 | Upper end |
| 636 | Capture ring |
| 638 | Primary hook |
| 640 | Inclined portion |
| 644 | Boss |
| 646 | Recess |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-5, one embodiment of a handbag securing device 2 (hereinafter "device") is shown. The device 2 includes a table arm 6 and door arm 10 that are rotatably interconnected to a post 14. The door arm 10 may also include an extension 12. The post 14 is interconnected to a hook 18 for securing a handbag that may also include a riser 22. The riser 22 and the extension 12 cooperate to form a lock 26, similar to that employed by a carabineer.

Figure 3:
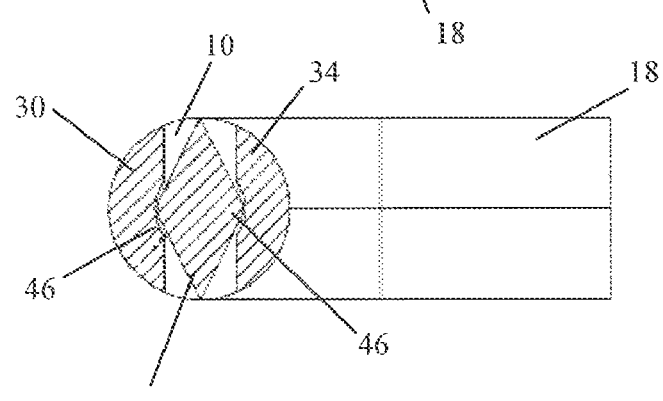
FIG. 3 is a cross-sectional view of FIG. 2.

With specific reference to FIG. 3, the extension 12 includes an outer protrusion 30 and inner protrusion 34 with a cavity 38 therebetween. The cavity 38 receives an appendage 42 of the riser. The outer protrusion 30 may include at least one indent 46 that receives a portion of the appendage 42 to provide a selectively breakable locking fit. That is, the contemplated interconnection is easy to open when an individual wishes to use the door arm 10, but maintains the extension 12 against the riser 22 when the extension is not in use. As can be appreciated by one skilled in the art, this allows the device to be easily folded and stored in the position of use shown in FIGS. 1 and 2.

Figure 4:
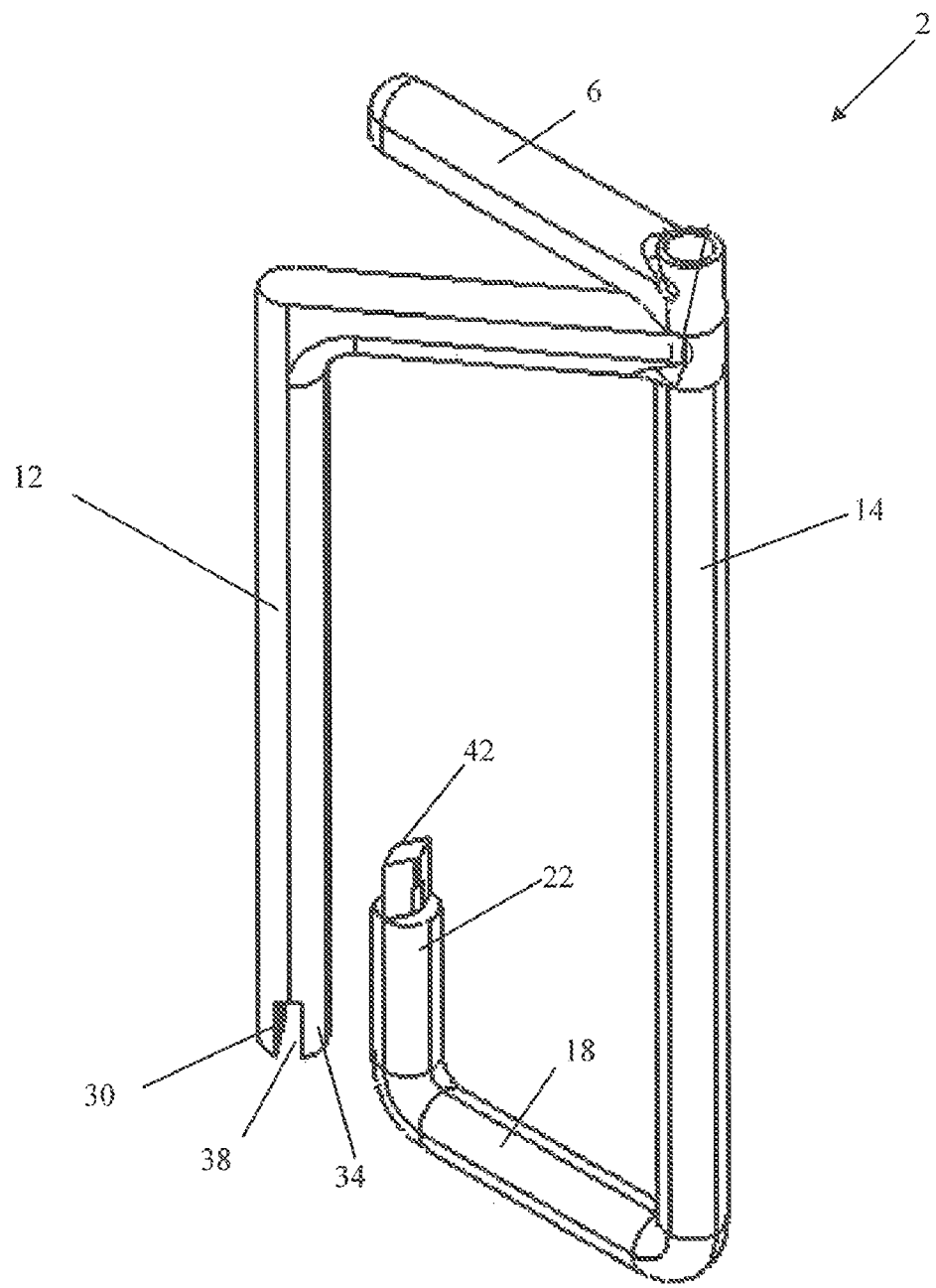
FIG. 4 is a perspective view of the embodiment shown in FIG. 1 shown in a second position of use, for positioning a handbag beneath a table.

Referring now to FIG. 4, the device 2 is shown ready to position a handbag adjacent to a horizontal surface such as a table. In this configuration, the table arm 6 is rotated about the post 14 for engagement onto a top surface of the table. The door arm 10 is also rotated to break the connection between the extension 12 and the riser 22. This allows an individual to place a handle or other portion of their handbag onto the hook 18. When the table arm 6 is engaged on the top surface of the table, for example, the handbag will rest beneath the table and hang above the floor.

Figure 5:
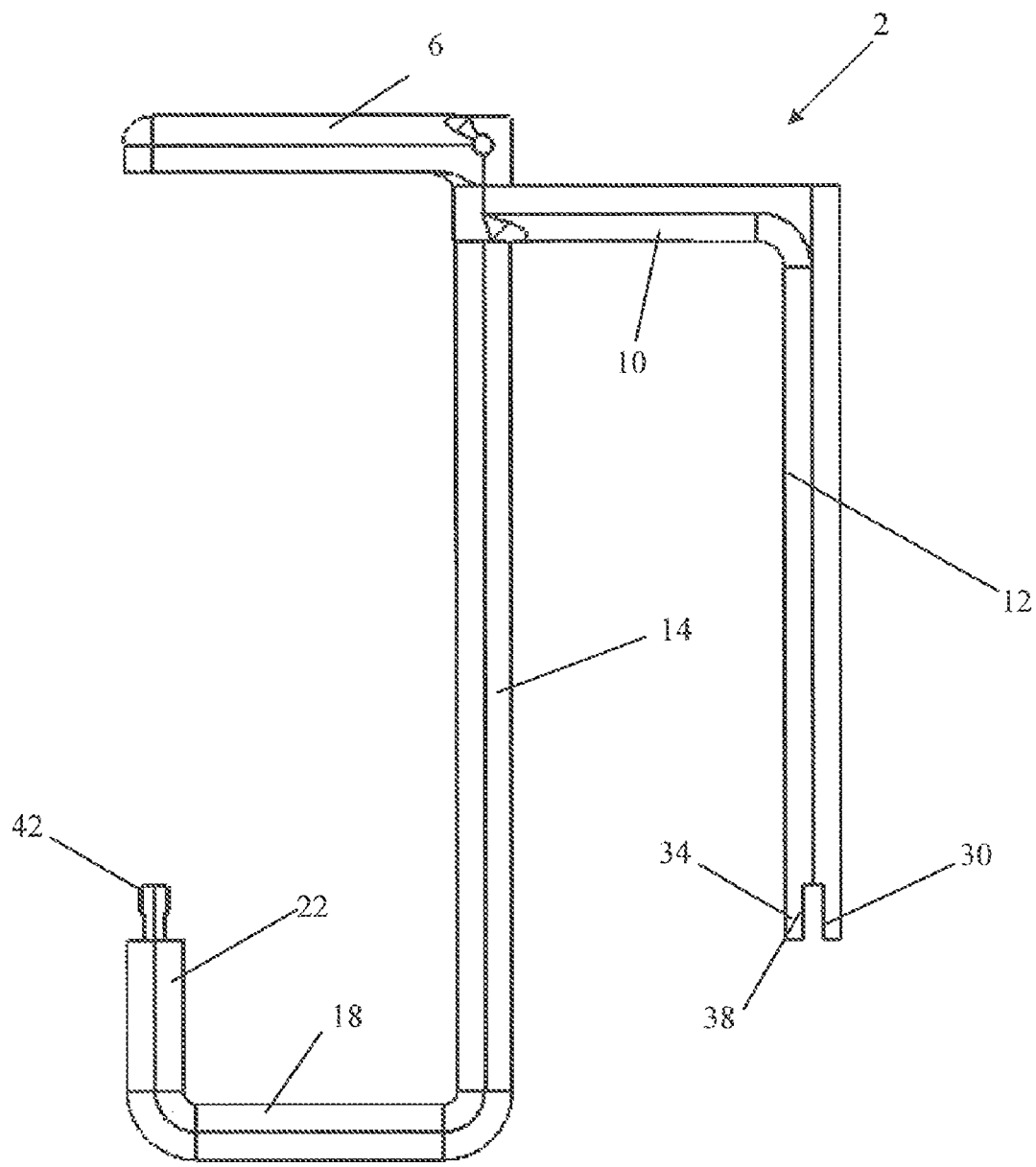
FIG. 5 is a front elevation view of the embodiment shown in FIG. 1 in third position of use, for positioning a handbag on a door.

Referring now specifically to FIG. 5, to associate the device 2 with a vertical surface, the door arm 10 is rotated about the post 14, which allows the door arm 10 to be placed over a wall of a bathroom stall, for example. The hook 18 is then exposed to allow an individual to place their handbag or jacket thereon.

Figure 6:
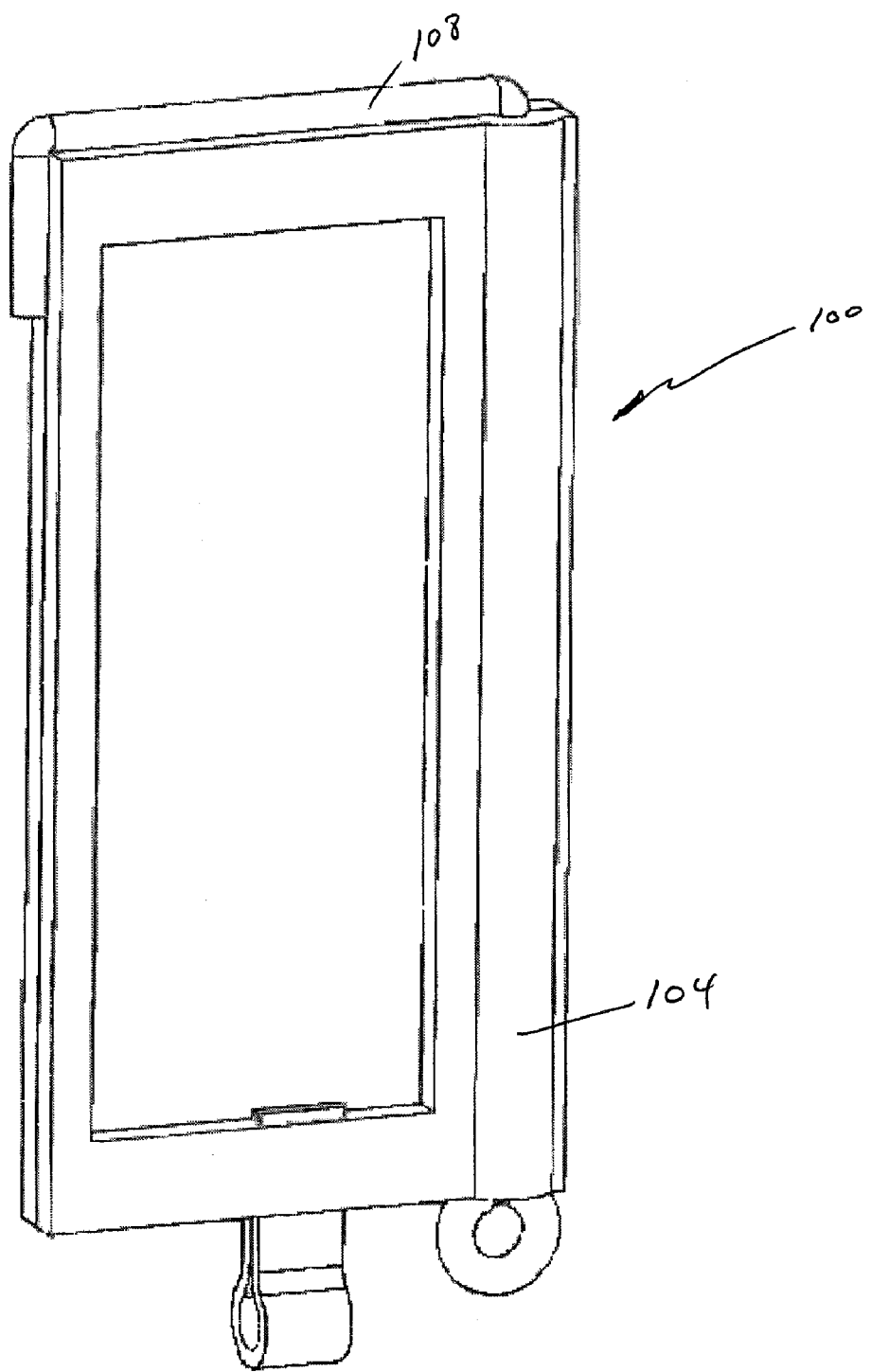
FIG. 6 is a perspective view of a luggage tag of one embodiment of the present invention that possesses a hook adapted for engagement on a door.
Figure 7:
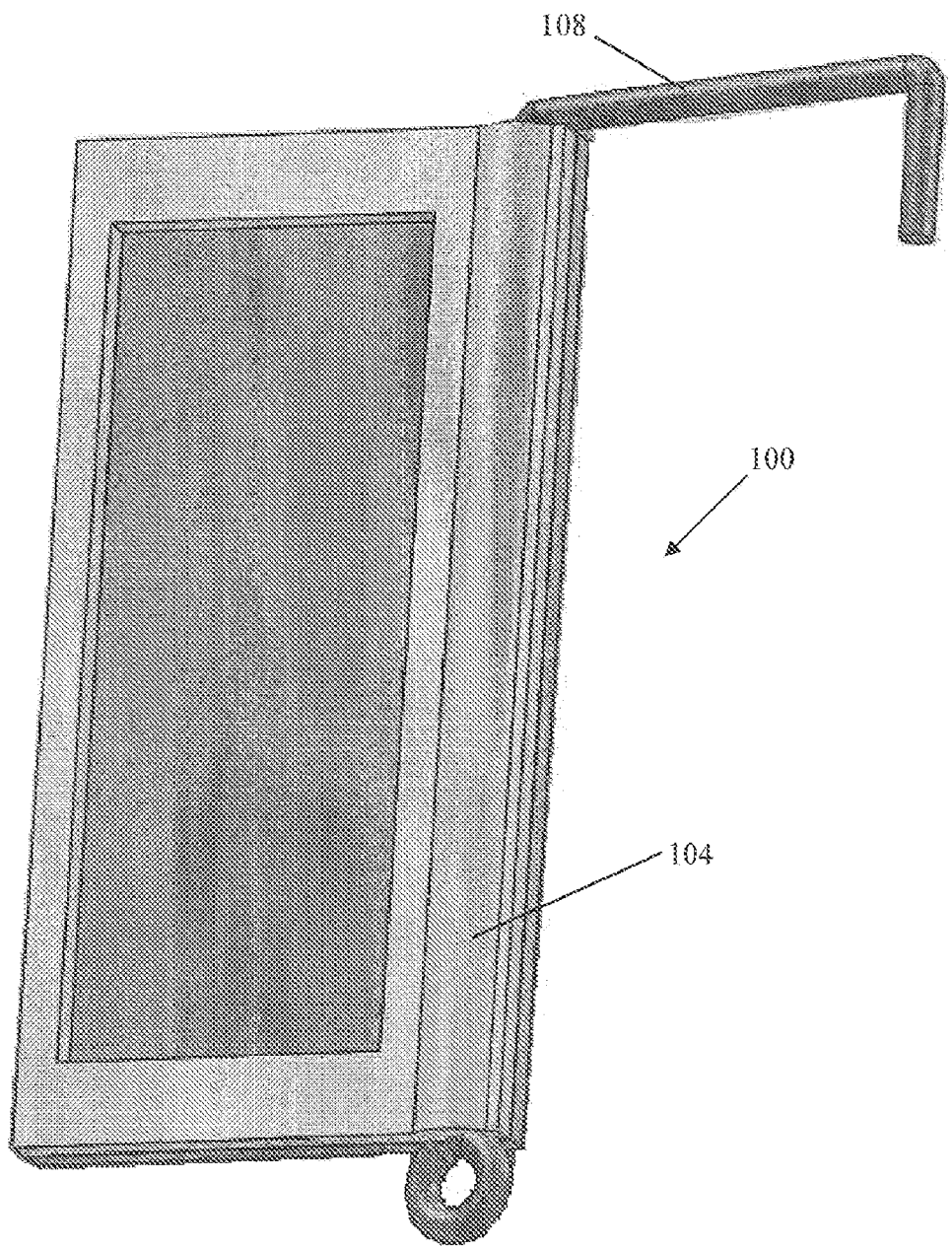
FIG. 7 is a perspective view similar to that in FIG. 6 wherein the device is shown in a second position of use.

Referring now to FIGS. 6 and 7, another embodiment of the present invention is shown that is in the form of a luggage tag 100. Often it is desirable to store luggage off the floor of an airport bathroom, for example. Here, the luggage tag 100 possesses a sleeve 104 that allows selective rotation of an associated door arm 108. In operation, the door arm 108 is rotated away from the luggage tag 100 and used to interconnect to a door. The luggage tag 100 is made of sufficient strength to support the weight of the luggage to which it is connected.

Figure 8:
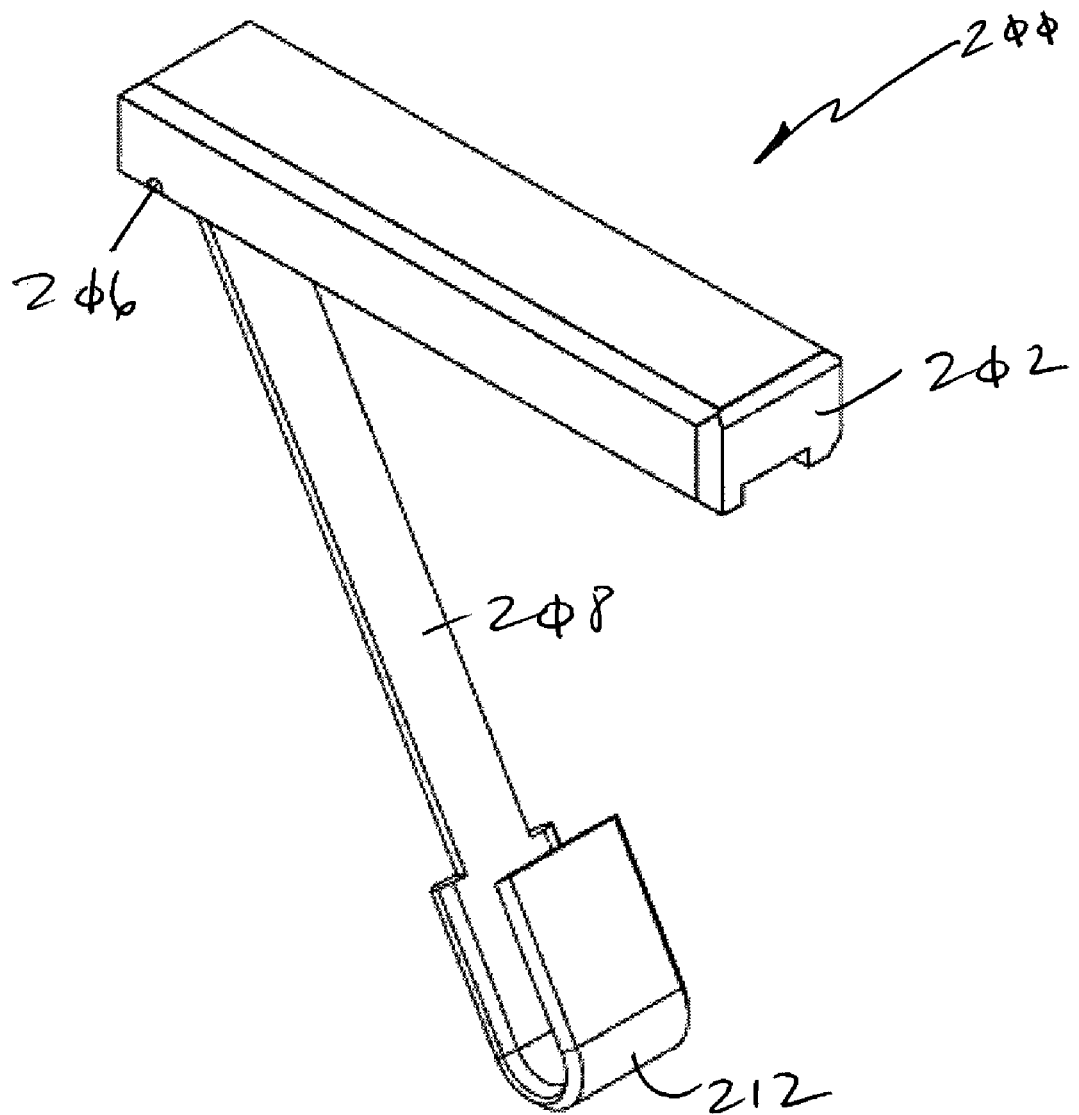
FIG. 8 is a front perspective view of another embodiment of the present invention.
Figure 9:
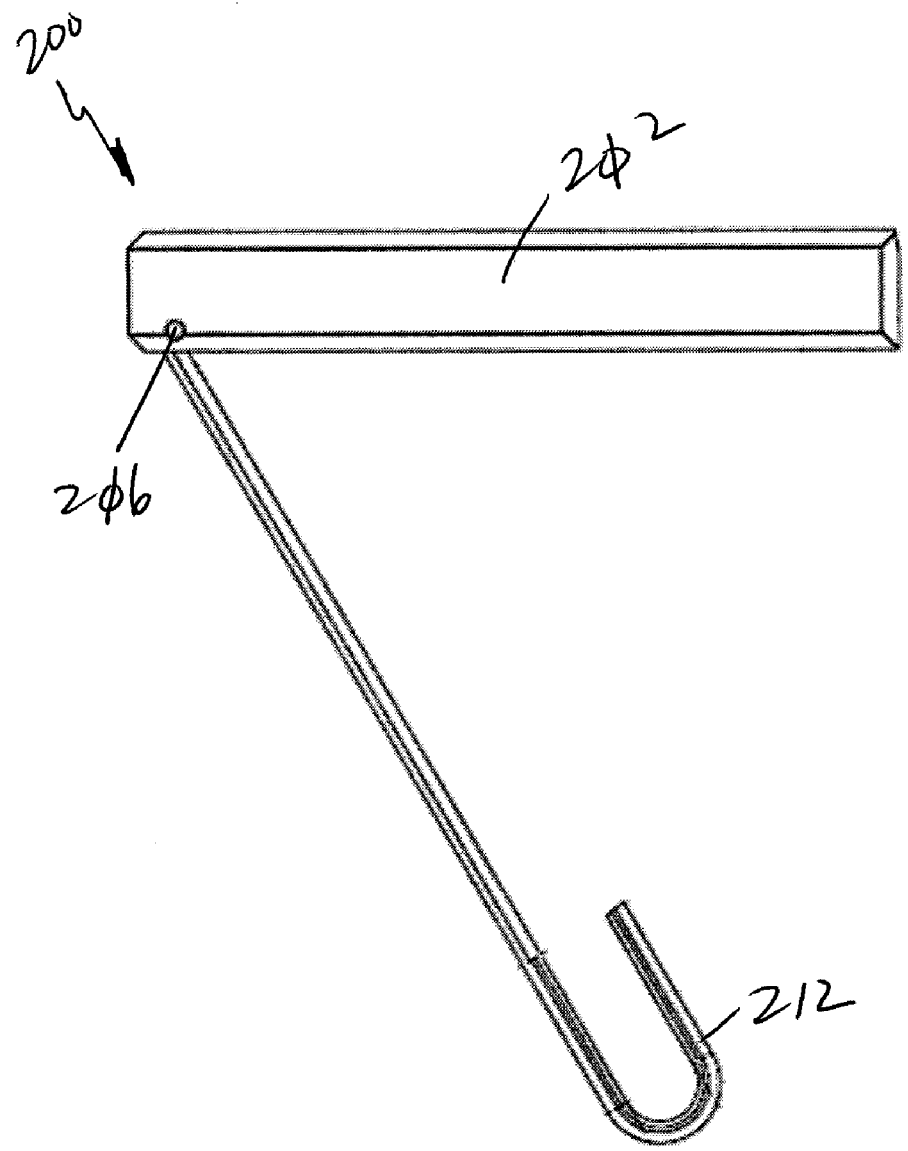
FIG. 9 is an elevation view of FIG. 8.
Figure 10:
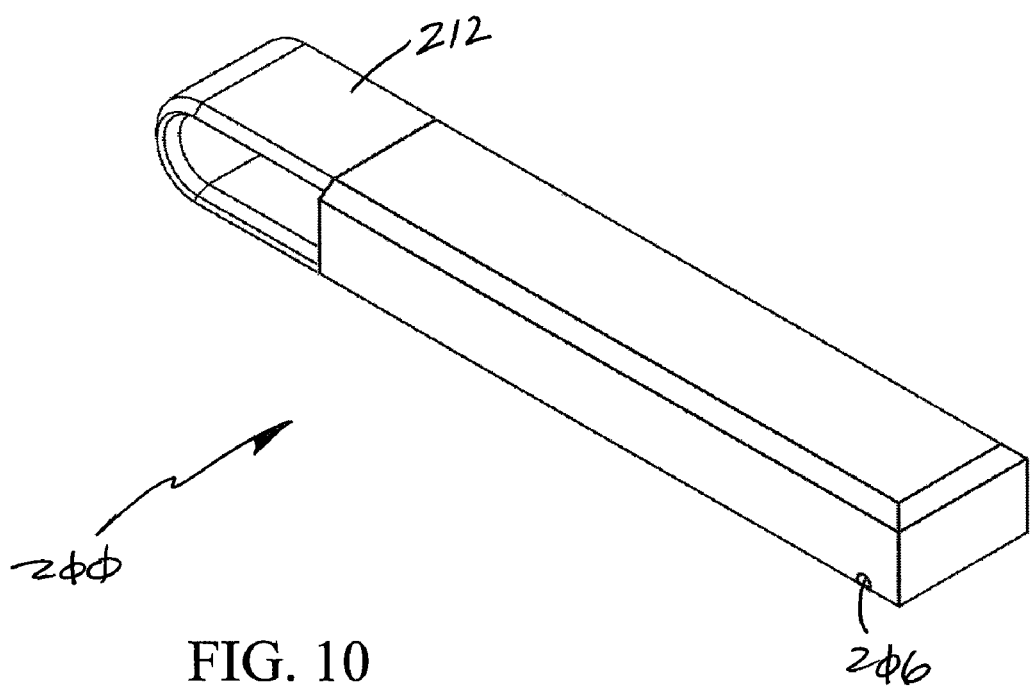
FIG. 10 is a perspective view of the embodiment shown in FIG. 8 shown in a first closed position of use.

Referring now to FIGS. 8-10, yet another device 200 is shown that includes a table portion 202 that is interconnected via a hinge 206 to a hanging portion 208. The hanging portion 208 has a distal end with a hook 212 for receiving a handbag. When not in use, the hanging portion 208 is folded relative to the table portion 202 and fits within a recess (not shown) of the table portion 202. When in use, the table portion 202 engages a top surface of a table with the hook 212 positioned to receive the handbag and suspend it beneath the table top. Upon review of the figures, it will be appreciated by one of skill in the art, that the table portion 202 has sufficient volume to accommodate a whistle, pill box, a light, a nail file, mace, and other items mentioned above. The table portion 202 also may be used as a handle to facilitate carrying groceries, for example, wherein the hook 212 accommodates the handle associated with at least one grocery bag.

Figure 11:
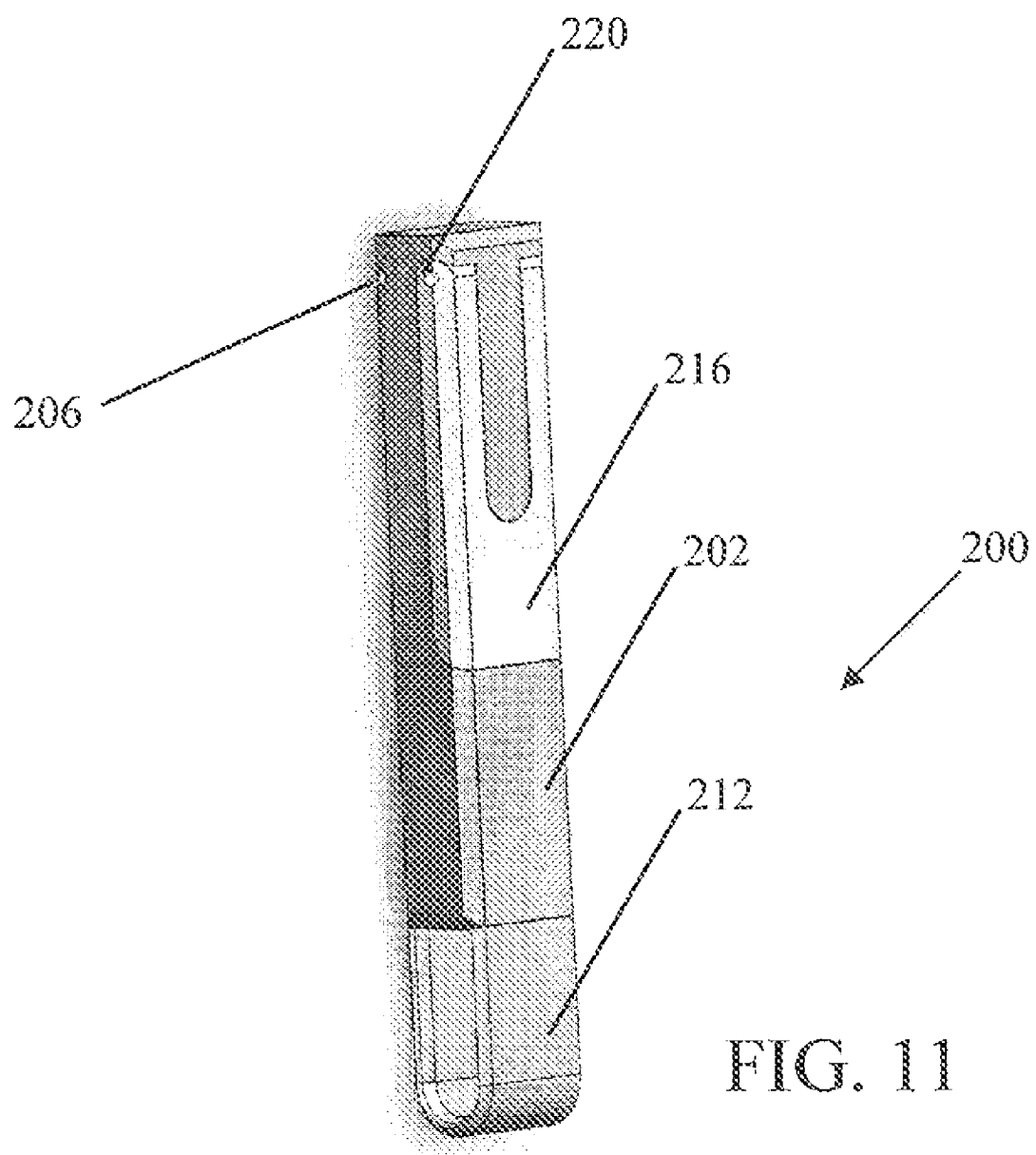
FIG. 11 is a perspective view of another embodiment of the present invention.
Figure 12:
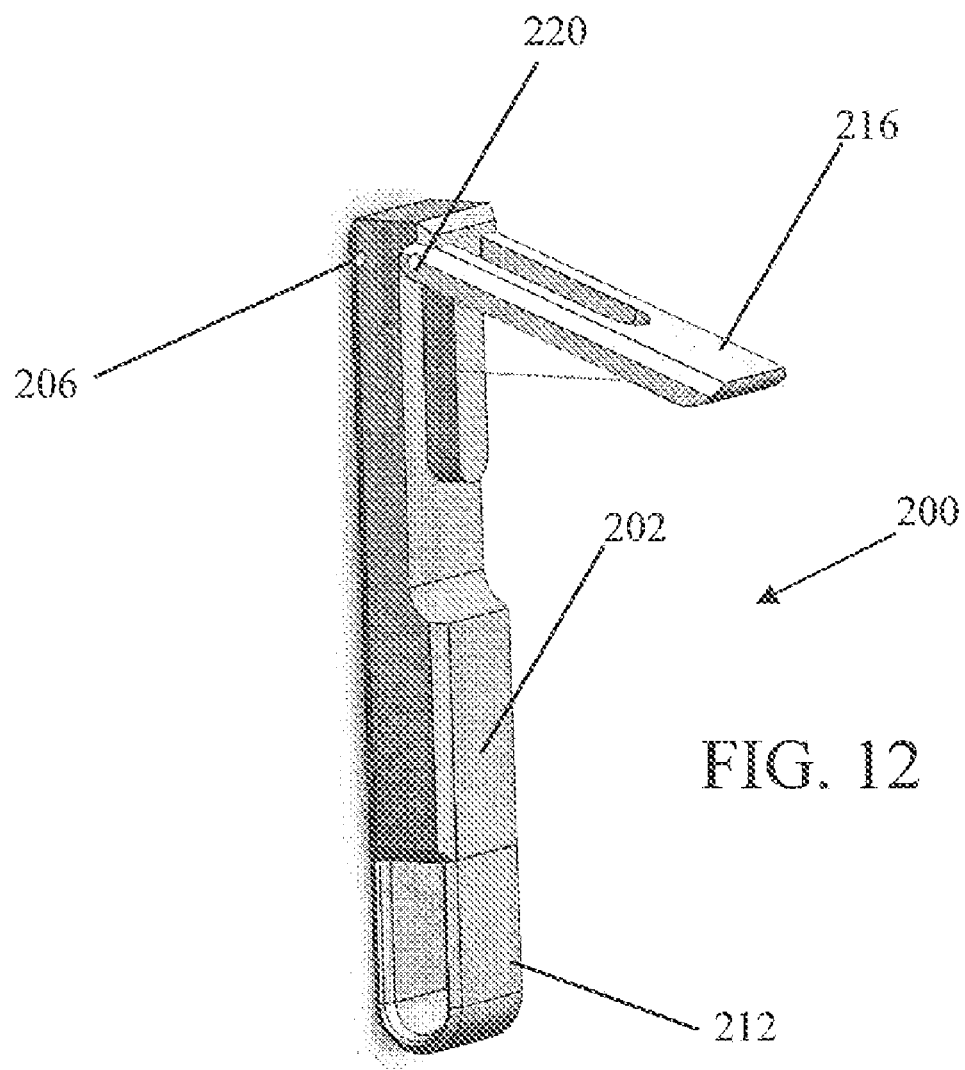
FIG. 12 is a perspective view similar to that of FIG. 11 wherein a door arm is shown in a second position of use.

Referring now to FIGS. 11 and 12, another embodiment of the present invention similar to that shown in FIGS. 8-10 is shown that also includes an additional door arm 216 interconnected by a hinge 220 to the table portion 202 of the device 200. In operation, the door portion 216 is selectively rotated relative to the table portion 202 and is used to engage an upper surface of a bathroom stall, for example.

Referring now to FIGS. 13-19, a device 300 of another embodiment of the present invention is shown. The device 300 includes a head 304 that is selectively interconnected to a primary hook 308. The primary hook 308 includes a post 312 that is selectively positionable within a groove 316 integrated into the head 304. The head 304 of one embodiment includes a first surface 320 with a recess 324 and a second surface 328 with a recess 332. In a second position of use shown in FIG. 15, for example, the head 304 is rotated wherein the post 312 is fixed within a notch 334 such that the second surface 328 is oriented for engagement onto a table 336 so that a handbag 340 may be secured on the primary hook 308. The device 300 also includes a door arm 344 that is rotatably interconnected to the primary hook 308 for engagement to an upper surface of a wall 348 which also positions the primary hook 308 in such a way to receive a purse, coat, or other item.

Figure 13:
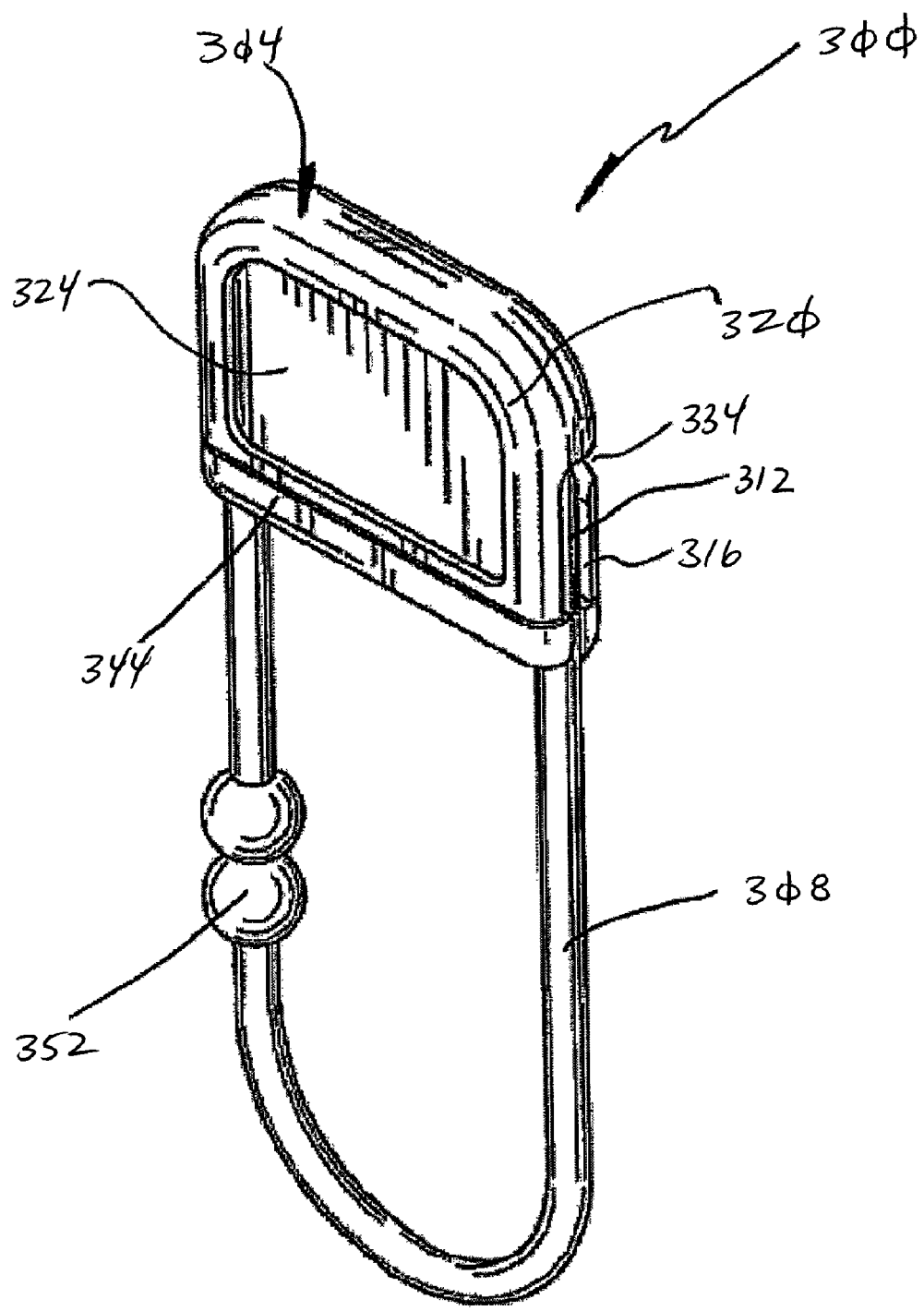
FIG. 13 is a perspective view of another embodiment of the present invention.
Figure 14:
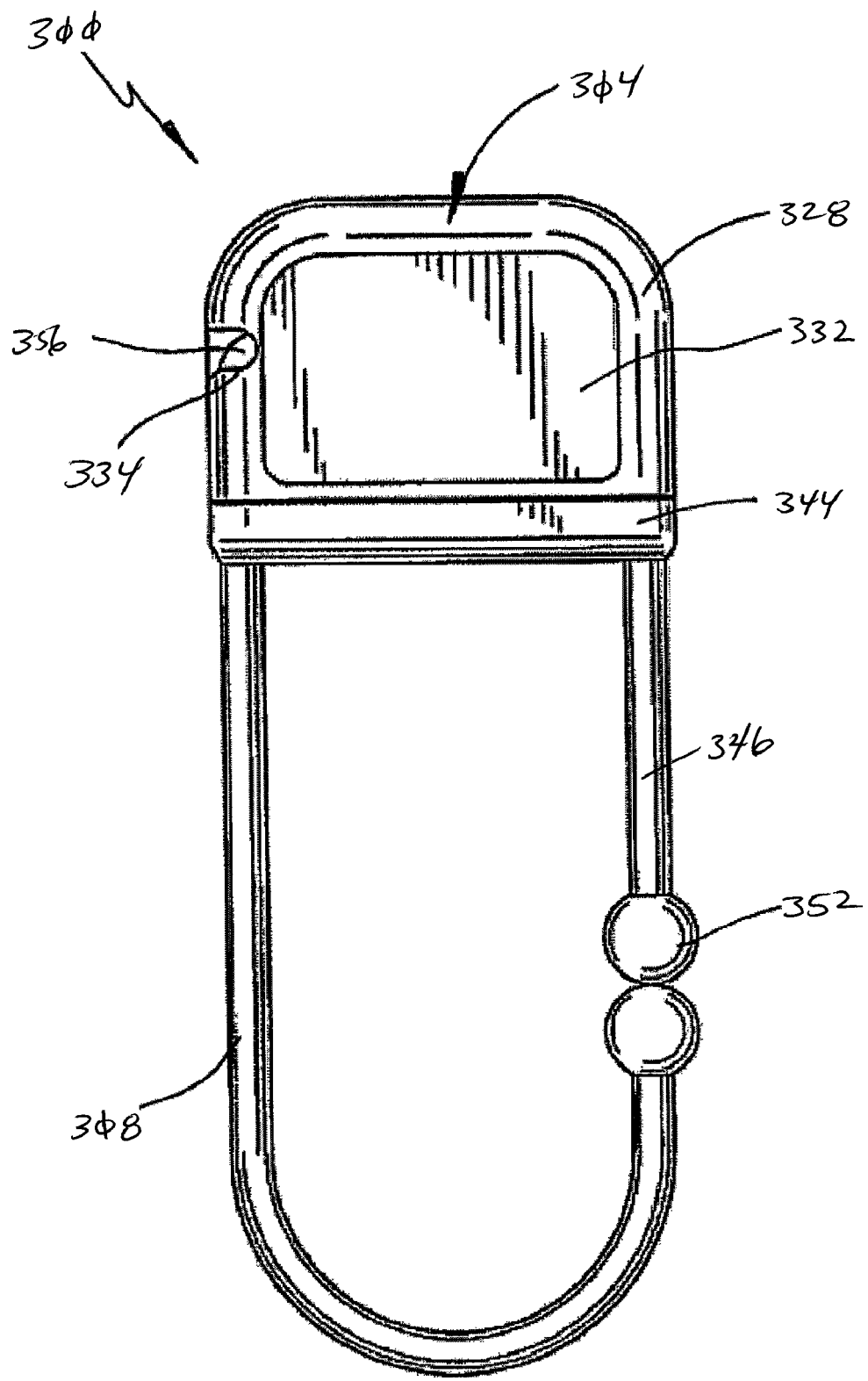
FIG. 14 is a front elevation view of FIG. 13.

FIGS. 13 and 14 show the device 300 in a first position of use with the head 304, primary hook 308 and door arm 344 generally aligned. In this configuration, the post 312 is positioned within the groove 316 of the head 304. This first position of use facilitates storage within a handbag, or displayed outside a handbag wherein the primary hook 308 is fastened about a strap thereof, for example. The door arm 344 may employ an extension 346 that cooperates with the free end of the primary hook 308 to form a substantially closed loop. Further, the primary hook 108 and extension 346 may terminate in a hook end 352. The hook ends may be spherical, as shown, or may be of other shapes as will be appreciated by those of skill in the art. Further, the hook ends 352 of one embodiment of the present invention include a threaded tapped hole (not shown) that is engaged on a threaded end of the extension 346 and the primary hook 308 (not shown). As such, the hook ends 352 may be selectively removed from the primary hook 308 and/or extension 346 to allow the integration of other items onto the primary hook 308 or extension 346. For example, it is contemplated that various beads or other accoutrements may be added to the device 300 to enhance or personalize the appearance thereof. For example, a series of beads and/or charms may be added to the primary hook 308 and/or extension 346. Further, at least one wine glass charm may be selectively associated with the device that may be removed and associated with a wine glass to mark the same.

The recess 324 is optional and one skilled in the art will appreciate that the first surface 320 may be continuous. The recess 324 may be used to receive an artistic feature, such as a decorative inlay. Those skilled in the art will appreciate that the head 304 may include a door wherein the recess functions as a storage location suitable for pills, for example. The recess may also accommodate a video screen that is associated with a battery integrated into the head 304. The contemplated screen may be used to display videos or pictures and/or other information may be associated with the world wide web. The recess 324 may also be configured to receive a static photo or photos. The recess 324 may also receive information related to the owner of the purse and function as a luggage tag. Further, the head 304 may be such size to accommodate a music playing device, similar to an iPod®, for example, wherein the head 304 may be interconnected to ear phones or may include a speaker. The head 304 may also include a wireless information transmitting/receiving device (i.e., a Bluetooth®) such that the device 300 may interact wirelessly with a communications device to display information on a panel integrated into the head 304 or an audio device integrated into the head. For example, the device 300 may be configured to function as a speaker phone or may receive and display real time news or stock market data. In order to conserve power, the recesses and/or surfaces of the head may also accommodate a solar panel wherein the device 300 obtains the power needed to run the associated Bluetooth® device, video screen, music device, calculator, etc.

Figure 16:
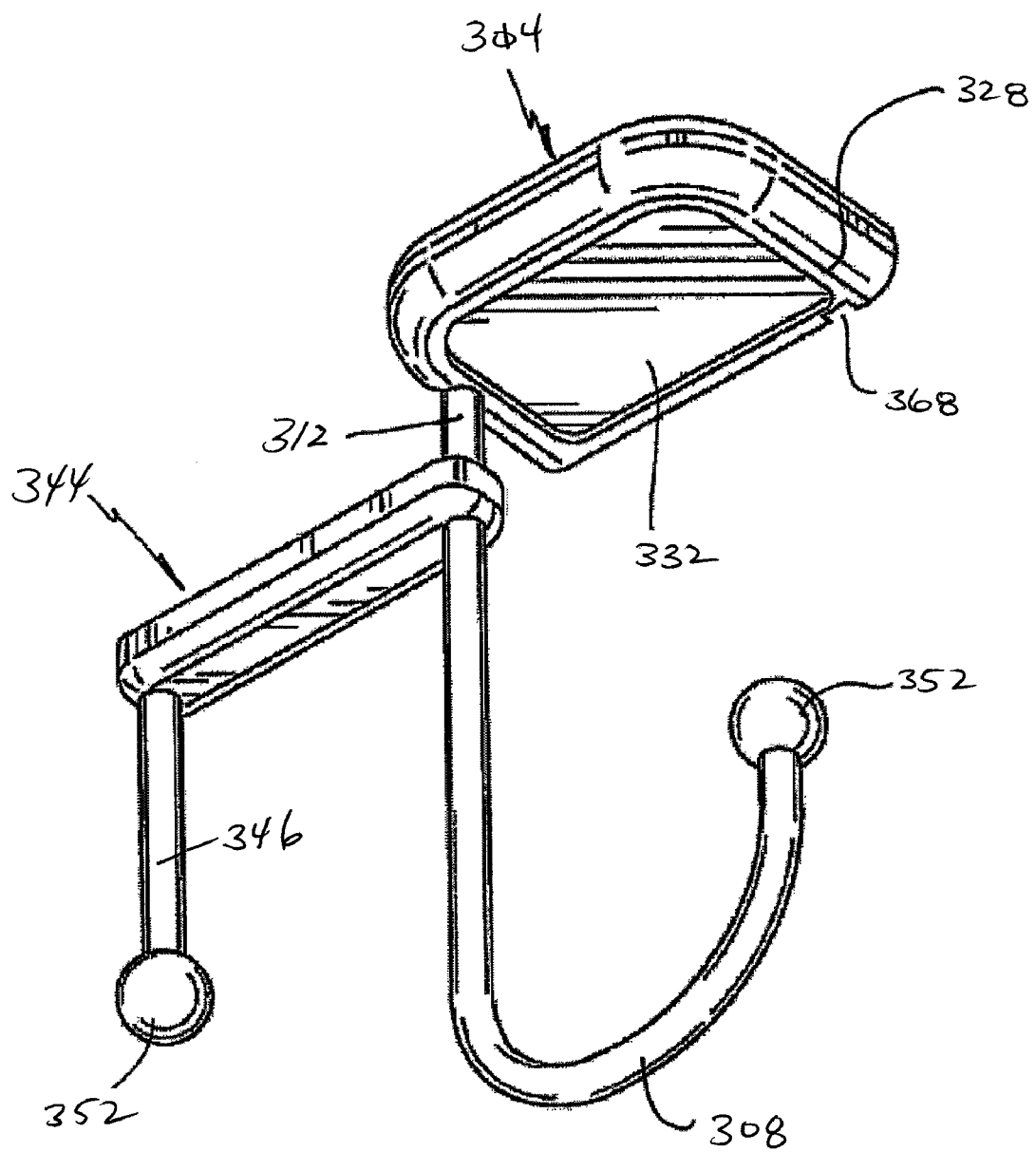
FIG. 16 is a bottom perspective view of FIG. 13 shown in a second position of use for engagement with a horizontal surface.

In order to lock the head 304 with respect to the door arm 344 to achieve the position of use shown in FIGS. 13 and 14, the head 304 may include a channel 364 that selectively receives a pin 360 associated with the door arm 344. This mechanical interconnection maintains the position of the head 304 relative to the door arm 344 when the post 312 is positioned within the groove 316. By pulling the head 304 away from the post 312, the pin 360 is repositioned within the channel 364 such that the pin 360 may be removed from a channel opening 368 as shown in FIG. 16. One skilled in the art will appreciate that the head 304 may be selectively associated with the auxiliary hook 344 by other mechanisms, such as a magnet.

Figure 15:
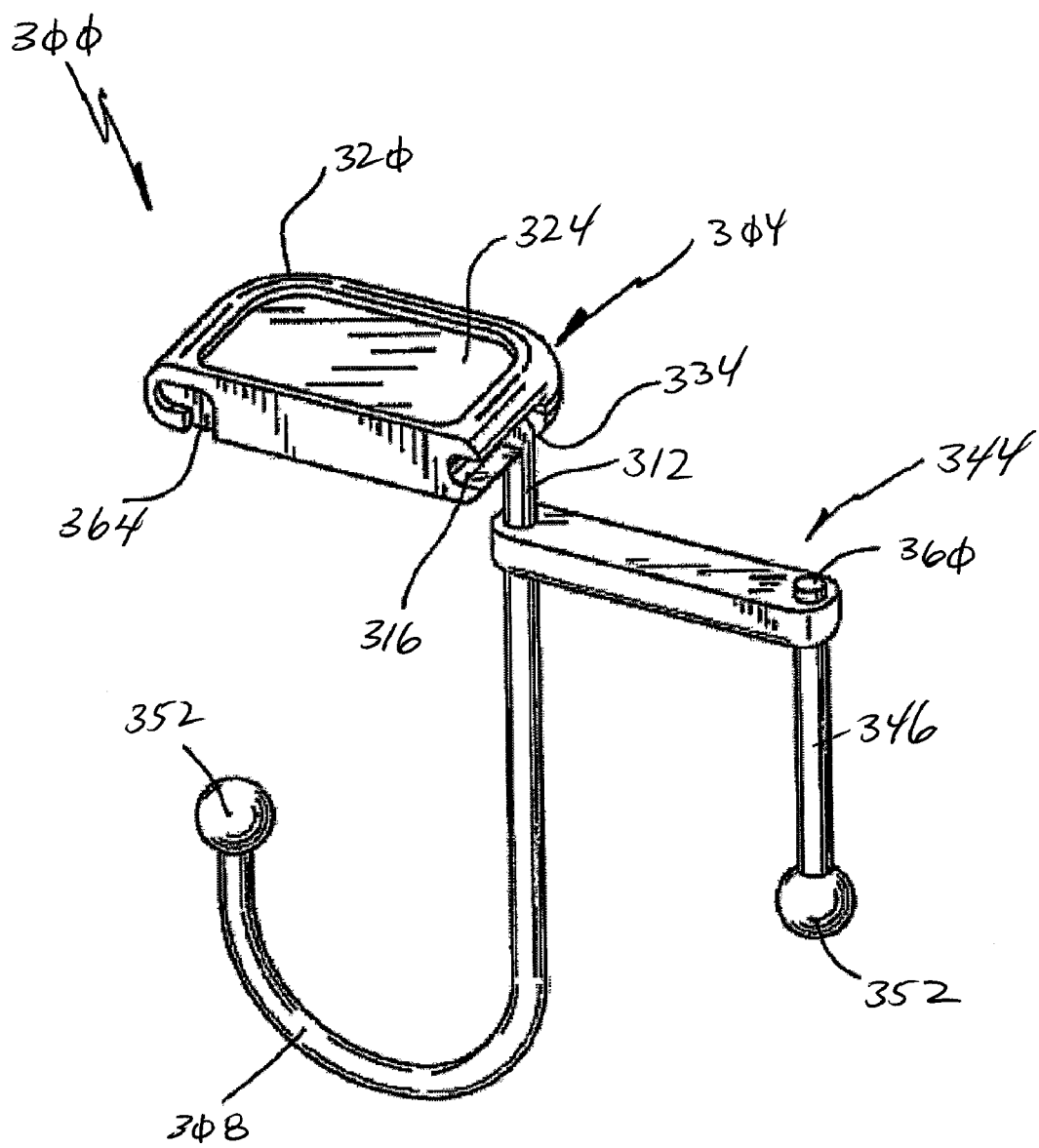
FIG. 15 is a perspective view of the device of FIG. 13 shown in a second position of use for engagement with a horizontal surface.
Figure 17:
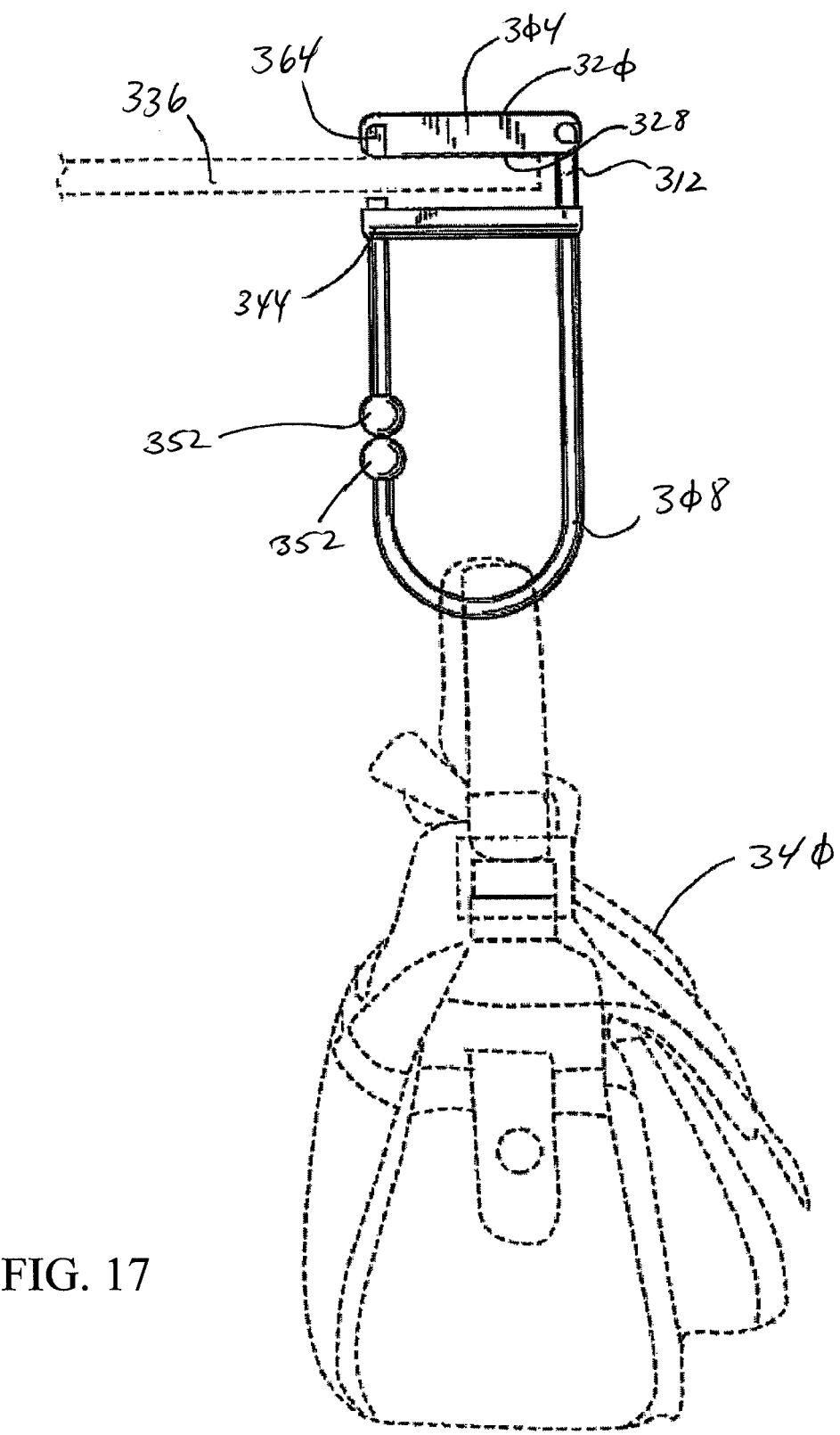
FIG. 17 is a front view of the device of FIG. 13 shown engaged on a table and holding a purse.

Referring now to FIGS. 15-17, the device 300 is shown in a second position of use that is adapted to engage a table 336. Here, the head 304 has been rotated with respect to the post 312 by pulling the head 304 in a direction transverse to the post 312. In one embodiment, the post 312 terminates in an arm (not shown, see for example #416 of FIG. 20) positioned within the head 304. In addition, the head 304 is preferably interconnected to the arm by way of a spring (not shown) that allows the head 304 to be pulled away, rotated around the arm and then released. After the head 304 is released, it is pulled by the spring towards the post 312 to position an upper part of the post 312, the notch 334, thereby locking the head 304 in the second position of use shown. FIG. 15 shows the door arm 344 rotated such that a handbag 340 is secured on the primary hook 308. The notch 334 secures the head 304 in the position for engagement onto a table. The door arm 344 may remain rotated away from the end of the primary hook 308 as shown, for example, in FIG. 16. The second surface 320 also may have a recess 332 to receive a gripping member made of silicone rubber, for example, to facilitate engagement of the head 304 to the table 336. One of skill in the art, however, will recognize that the gripping member may be integrated directly into the second surface 328 wherein no recess is required.

Once the head 304 is swiveled as shown, the second surface 328 of the head 320 is placed on a top surface of a table 336 wherein the first surface 320 faces upwardly. The primary hook 308 is then positioned under the table 336 and is able to receive the handbag 340. Finally, the door arm 344 may then be swiveled into place wherein the hook ends 352 of the primary hook 308 and the auxiliary hook 344 generally coincide.

Figure 18:
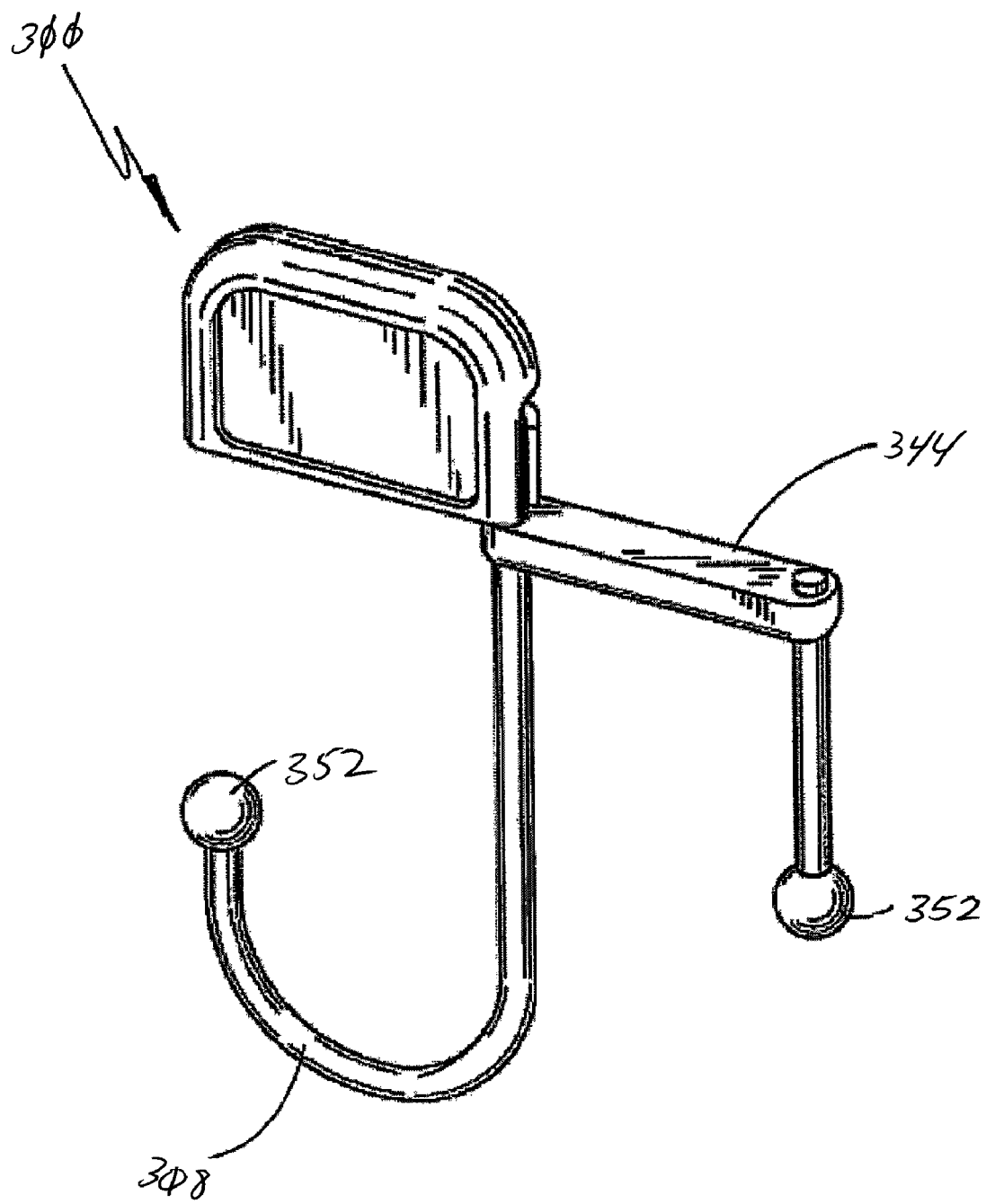
FIG. 18 is a perspective view of FIG. 13 shown in a third position of use for engagement with an upper edge of a vertical surface.
Figure 19:
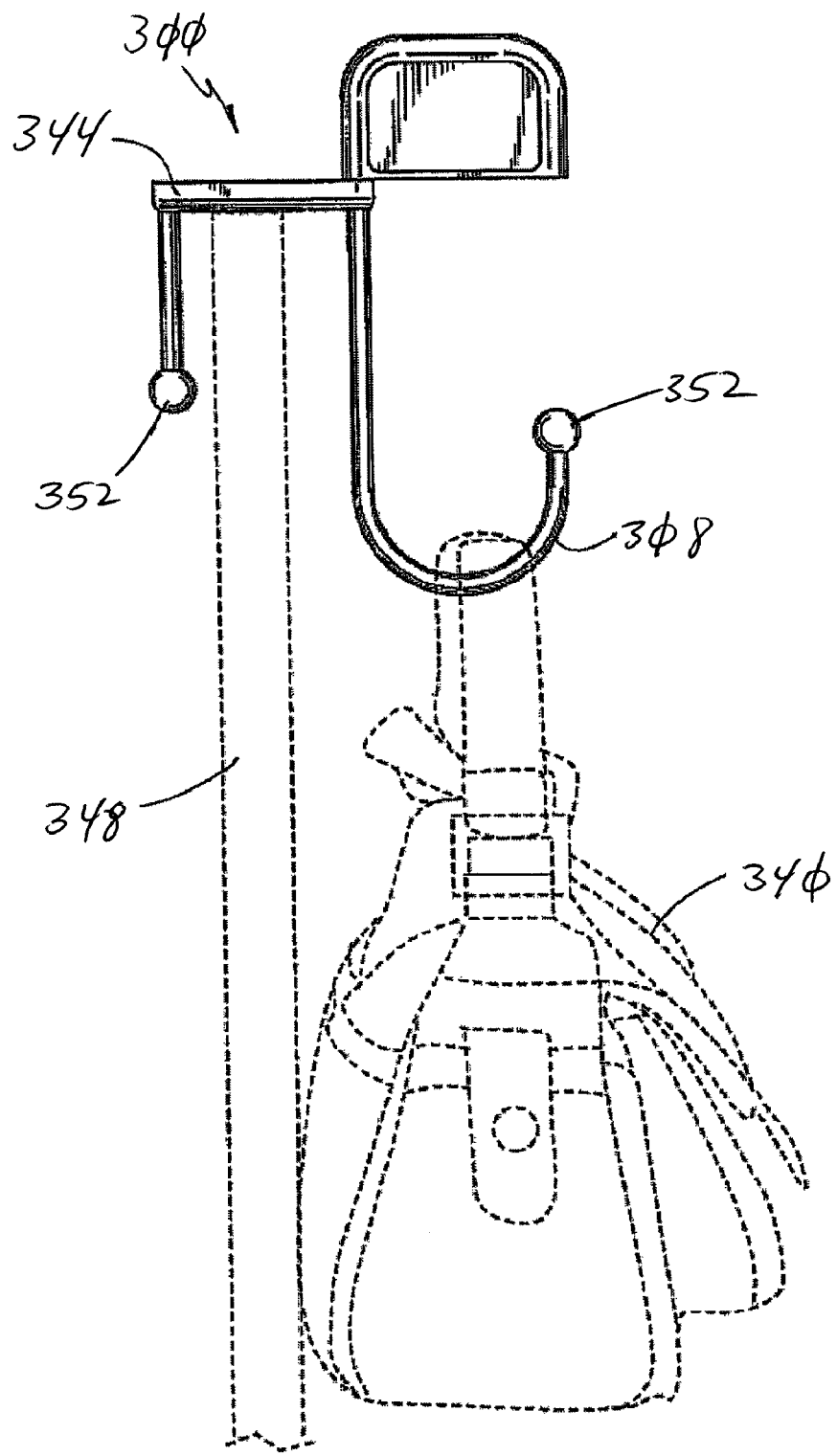
FIG. 19 is a front elevation view of the device of FIG. 13 shown associated with a vertical surface.

Referring now to FIGS. 18 and 19, a third orientation of the device 300 is shown wherein the door arm 344 is rotated away from the primary hook 308 with their respective hook ends 352 separated. The door arm 344 includes an upper surface that engages an upper edge of a vertical wall 348 so that the primary hook 308 is positioned on one end of the wall 348 and is able to receive the handbag 340 as shown. In operation, this configuration would be used in conjunction with a bathroom stall wherein the door arm is placed on a wall 348 adjacent to the user wherein the handbag 340 is firmly secured close to the individual using the bathroom facilities.

Figure 20:
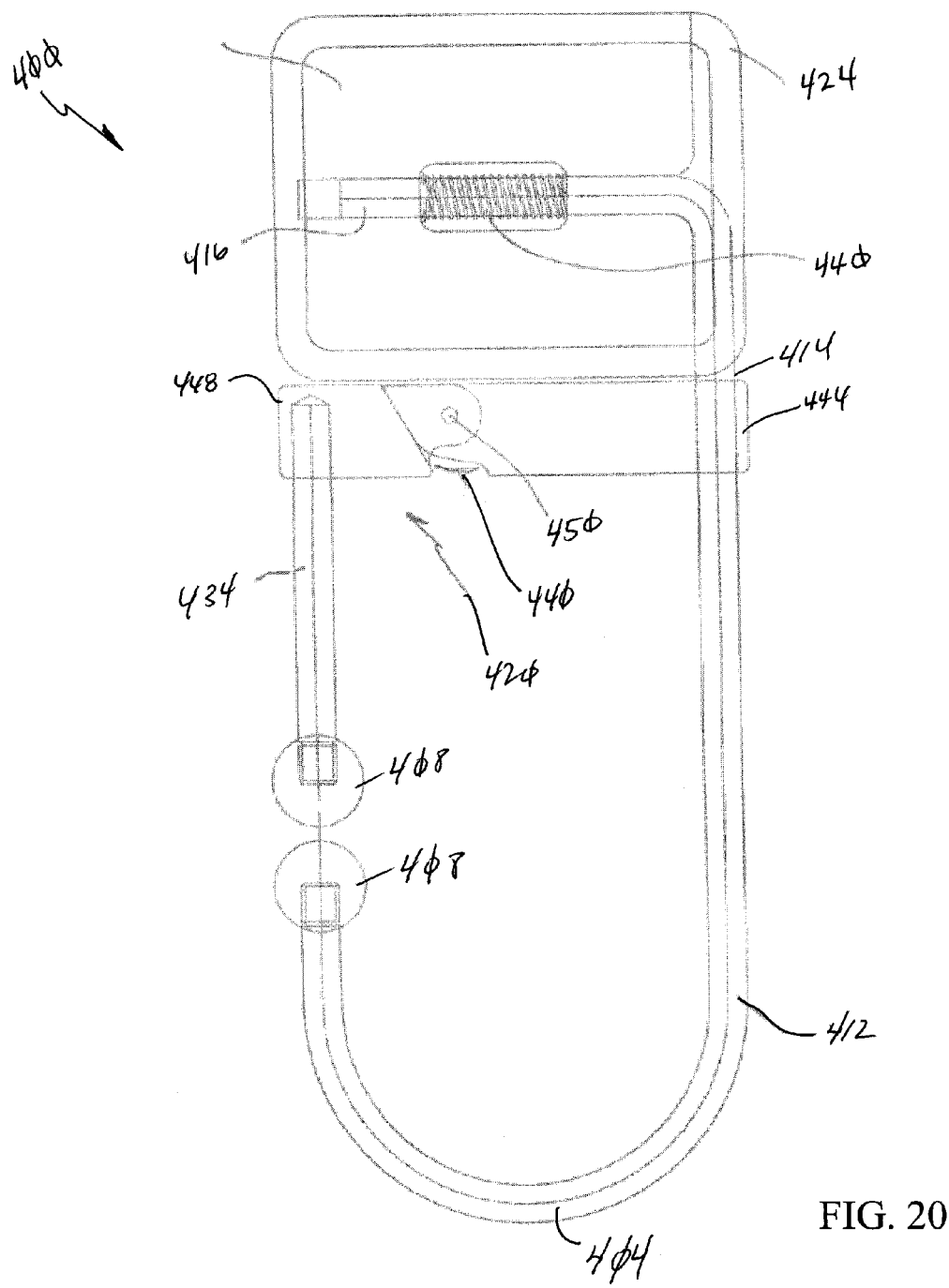
FIG. 20 is a front elevation view of another embodiment of the present invention.
Figure 21:
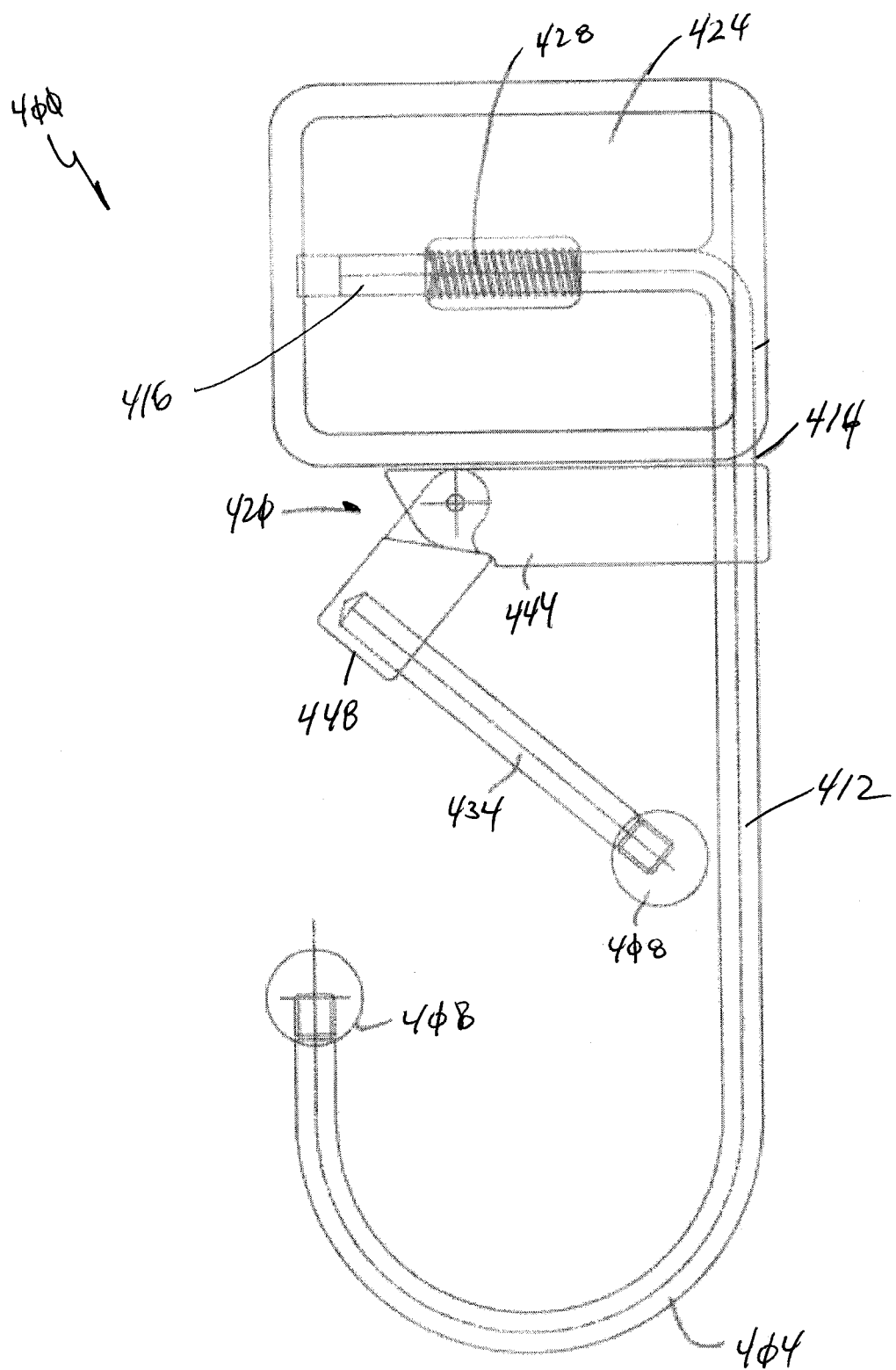
FIG. 21 is a front elevation view similar to that of FIG. 20 wherein a door arm is shown in the second position of use for receipt of a handbag.

Referring now to FIGS. 20-25, yet another handbag securing device 400 of the present invention that employs components similar to that of a carabineer is provided. More specifically, this embodiment of the present invention includes a primary hook 404 for receiving a handle of a handbag. The primary hook 404 includes a hook end 408 that is preferably selectively interconnected to an end of the primary hook. The primary hook 404 has a substantially linear portion 412 that is associated with a post 416. A door arm 420 that is rotatably interconnected to the post 414. The device 400 also includes a swiveling head 424, similar to that described above that is selectively biased by a spring 440 associated with a post arm 416. To swivel, the head 424 is pulled away from the post 416, rotated and allowed to relax into a notch 432 to maintain the orientation of the same. The rotation of the head 424 is shown in FIG. 21.

The door arm 420 includes a first portion 444 and a second portion 448 that are interconnected by way of a hinge 450. The first portion 444 and the second portion 448 are biased by the spring 428, such as a leaf spring that allows an extension 434 associated with the return to a first position of use, shown in FIG. 21, for example, when there is no force acting on the extension 434.

In operation, the head 424 is pulled away from the post arm 416 as described above rotated, and allowed to relax against the post 414 such that the post 414 rests in the notch 432. The handle of the handbag or attaché would then be engaged against an extension 434 associated with the door arm 420 towards the linear portion 412, thereby overcoming the spring force and allowing the extension 434 to rotate about the hinge 450. After the handbag is securely located on the hook 408, the extension 434 would snap back into place due to the force exerted by the spring 440. Thus, the handbag would be secured within the boundaries of the door arm 420, extension 434 and primary hook 408.

Figure 22:
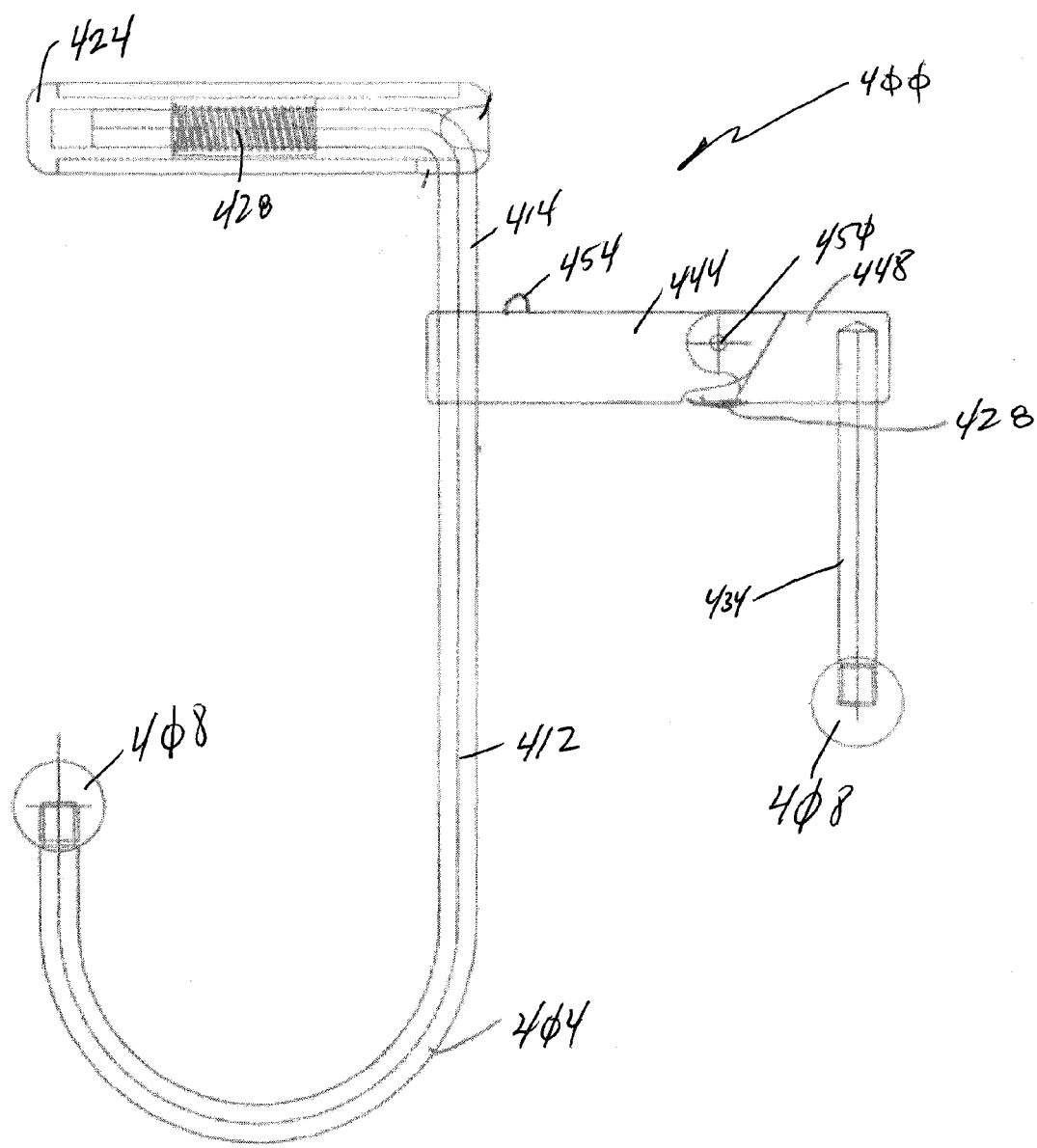
FIG. 22 is a front elevation view of the handbag of FIG. 20 wherein a head has been rotated for engagement on a table and the door arm has been rotated for engagement on an upper edge of a vertical surface.

FIG. 22 also shows the door arm 420 rotated in a second position of use that allows the device 400 to be associated with a vertical surface, such as a bathroom stall. The door arm 420 may include a plunger 454, which also may be spring loaded, that is adapted to interface with a portion of the head 424 when in a first position of use (FIG. 20) to maintain the head 424 in the first position of use. The spring 440 may be the same spring associated with the extension 434 wherein rotation of the extension 434, described below, will allow the pin 436 to retract within the door arm 420 to allow the head 424 to move as contemplated.

Figure 23:
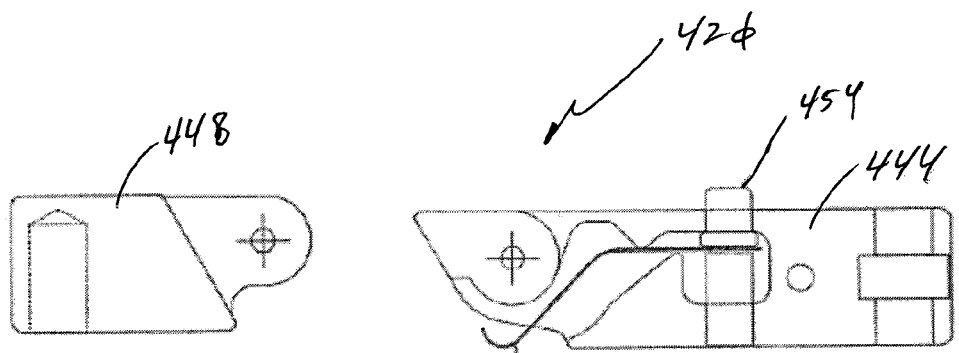
FIG. 23 is an exploded detail view of the door arm of one embodiment of the present invention.
Figure 24:
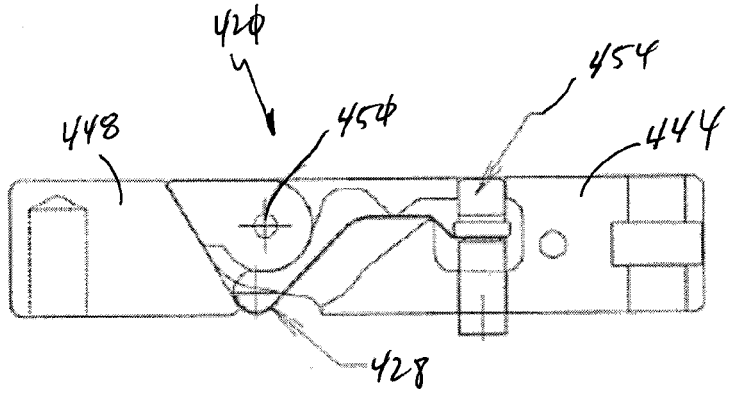
FIG. 24 is a door arm of one embodiment of the present invention having a first portion and a second portion.
Figure 25:
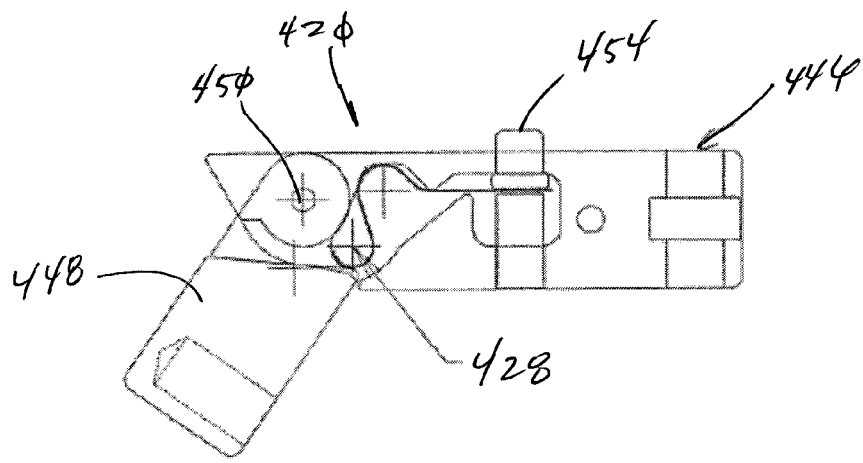
FIG. 25 is the door arm of FIG. 24 shown in the second position of use.

The plunger 454 and spring 440 combination of one embodiment of the present invention is shown in FIGS. 23-25. Here, the first portion 444 and second portion 448 of the door arm 420 area hingedly interconnected and associated with a spring 440. The spring 428 is flexed by rotation of the first portion 444 relative to the second portion 448, which also forces a plunger 454 upwardly to lock the head relative to the door arm 420. When in a first position of use, the plunger 454 is depressed within the door arm 420, thereby allowing the head to move. The plunger 454 may have a rounded profile that enhances deflection into the door arm 420 when the plunger 454 is contacted by the head 424. The plunger 454 is received within a groove (not shown), or an aperture when the head 424 is in the first position of use.

To secure the device 400 to a table, the head 424 is pulled in a direction away from the post 414, thereby compressing the spring 428 integrated therein. Next, the head 424 is rotated as described above in order to place a gripping member (not shown) in an orientation to be received on a table. The door arm 420 may then remain in place or be rotated outwardly as shown in FIG. 22 to allow placement of the handbag on the hook 408. When used in a first position of use, the first portion 444 of the door arm 420 is rotated with respect to the second portion 448 of the door arm 420, thereby moving the extension 434 to allow the device 400 to be incorporated onto a handle of a handbag. The deflection of the first portion 444 moves the plunger 454 upwardly by the compressed spring, thereby locking the head 424 relative to the door arm 420.

Figure 26:
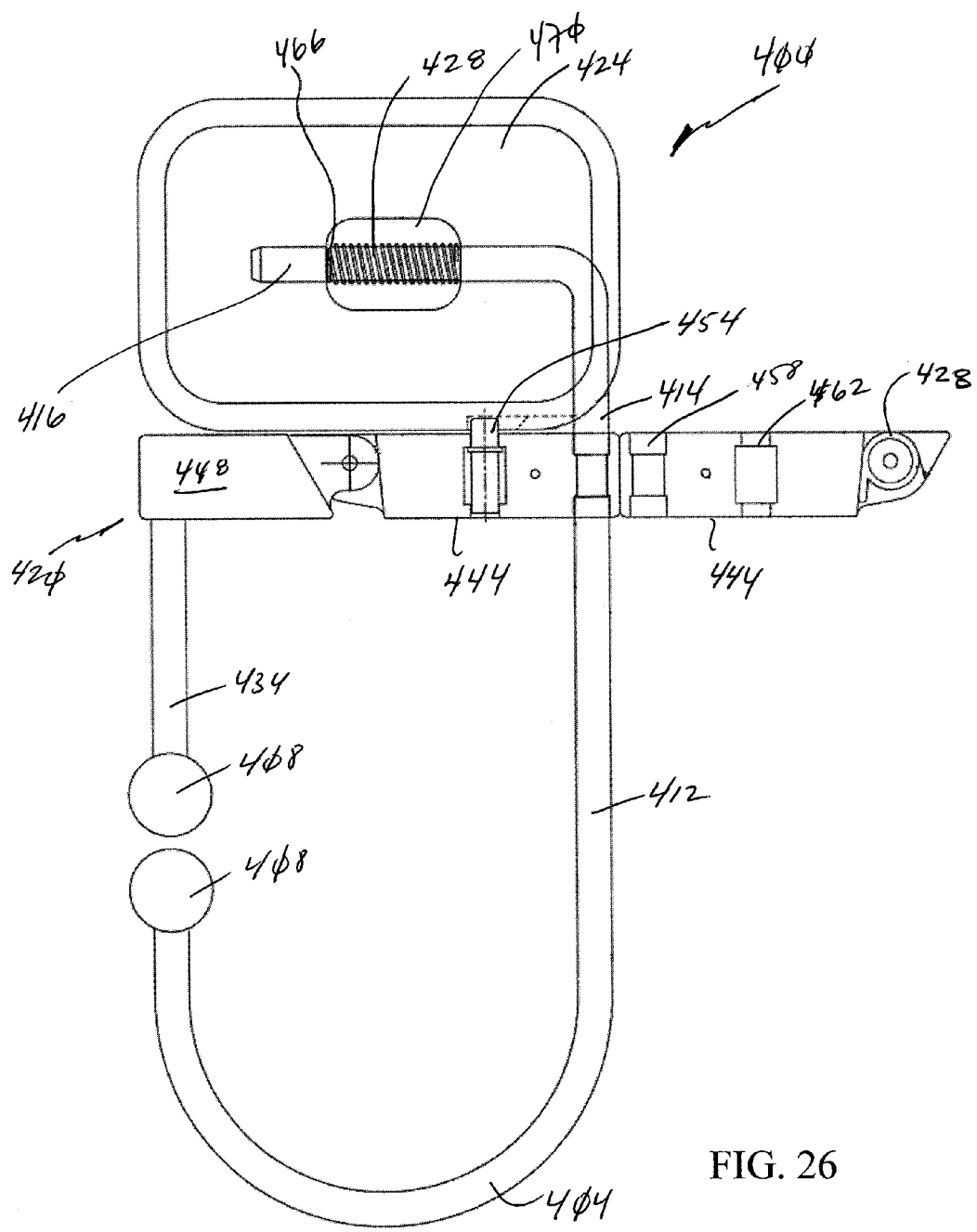
FIG. 26 is a front elevation view of an embodiment of the present invention similar to the embodiment of FIG. 20.
Figure 27:
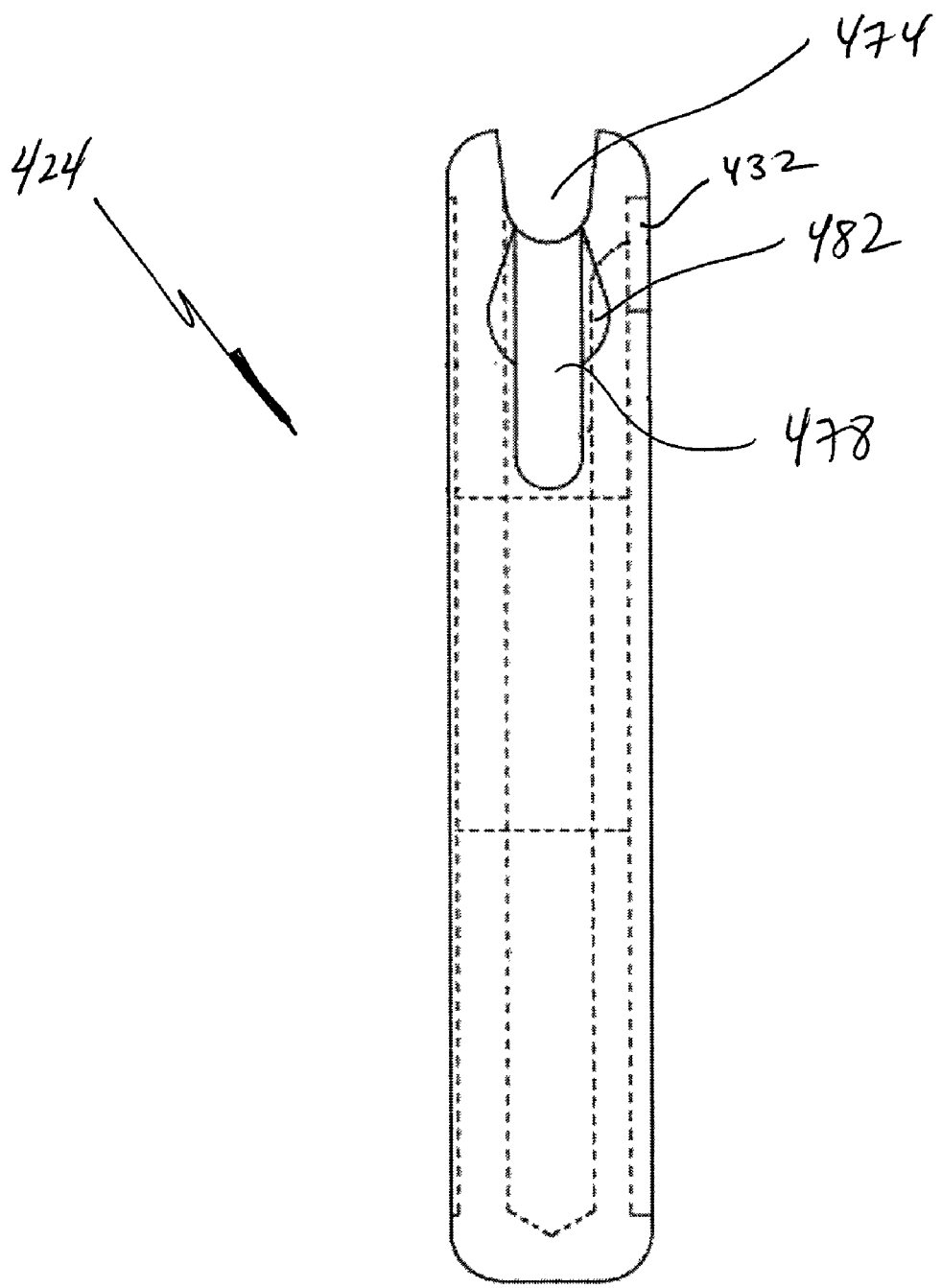
FIG. 27 is a plan view of the head of some embodiments of the present invention.
Figure 28:
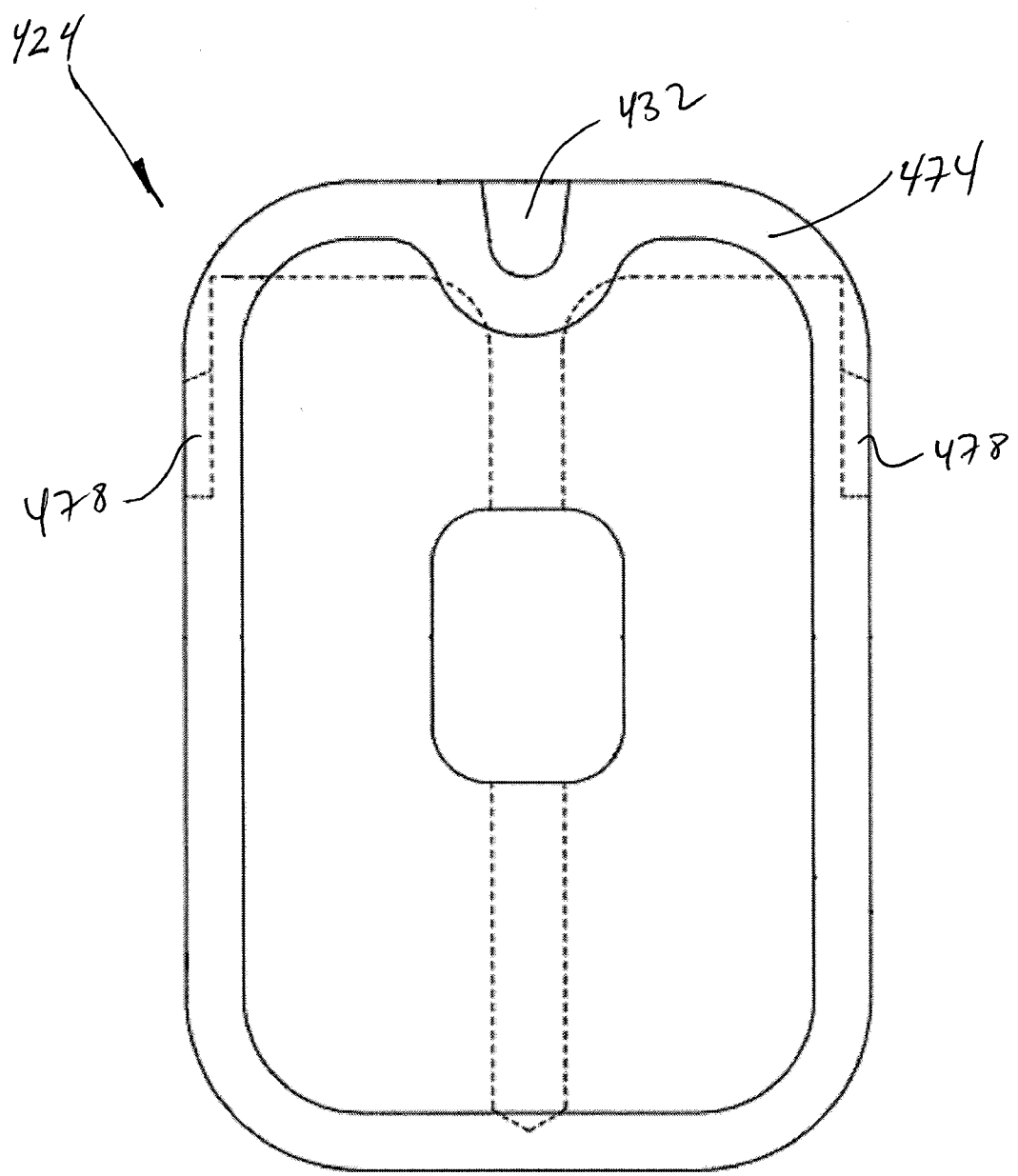
FIG. 28 is a front elevation view of the head shown on FIG. 27.

FIGS. 26-28 show another embodiment of the present invention similar to that of FIG. 20 wherein the door arm 420 is of a different construction. More specifically, the first portion 444 of the door arm 420 is shown in an open position prior to final assembly. The door arm includes a first hole 458 and a second hole 462 for receipt of the post 414 and to accommodate the plunger 454, respectively. In this embodiment of the present invention, the spring 428 is a torsion spring as opposed to the spring shown in FIGS. 23-25 provided above. The head 424 of this embodiment of the present invention is operably interconnected to the post arm 416 that further includes a notch 466. A spring 428 is configured such that an end portion thereof is seated in the notch 466 and thus held in place. In operation, the spring 428 is integrally positioned within a cavity 470 of the head 424 wherein the post arm 416 is placed through the spring 428. When the notch 466 of the post arm 416 encounters the end of the spring 428, the spring 428 snaps into the notch 466 to secure the post arm 416 within the head 424.

Referring now specifically to FIGS. 27 and 28, the head 424 of one embodiment of the present invention is shown that includes a groove 474 and a channel 478. The channel 478 includes a contoured sidewall 482 to facilitate receipt of the plunger (see FIG. 26). One skilled in the art will appreciate that the top surface of the head and the bottom surface of the head may each include a channel 478. Similarly, the groove 474 may extend from the top surface of the head to the bottom surface of the head. One skilled in the art will appreciate that such an elongated groove may be employed on other embodiments of the present invention described herein such that the head 424 may be rotated and locked into the first position of use in at least two ways.

Figure 29:
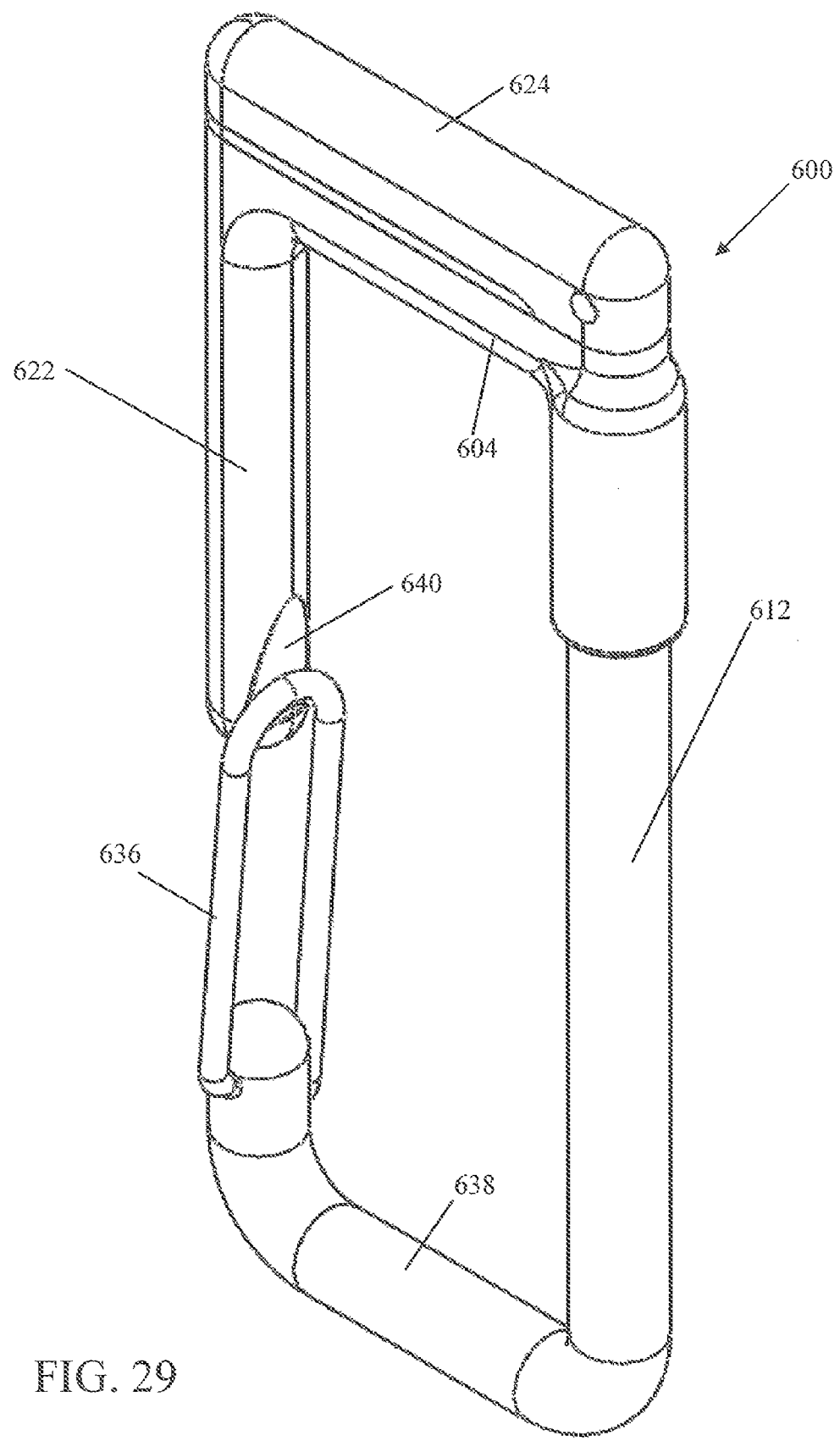
FIG. 29 is a perspective view of another embodiment of the present invention.
Figure 30:
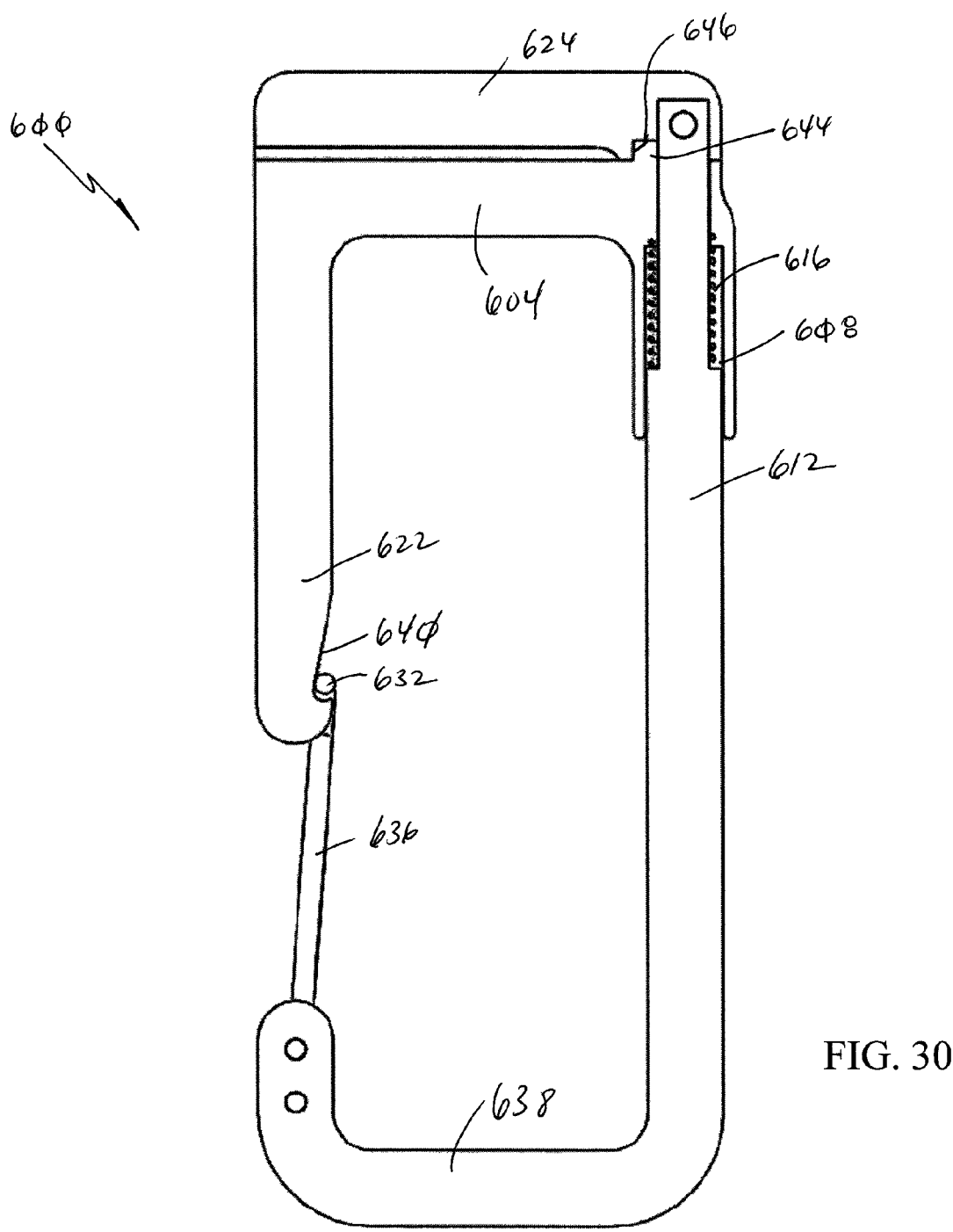
FIG. 30 is a cross-sectional view of FIG. 29.
Figure 31:
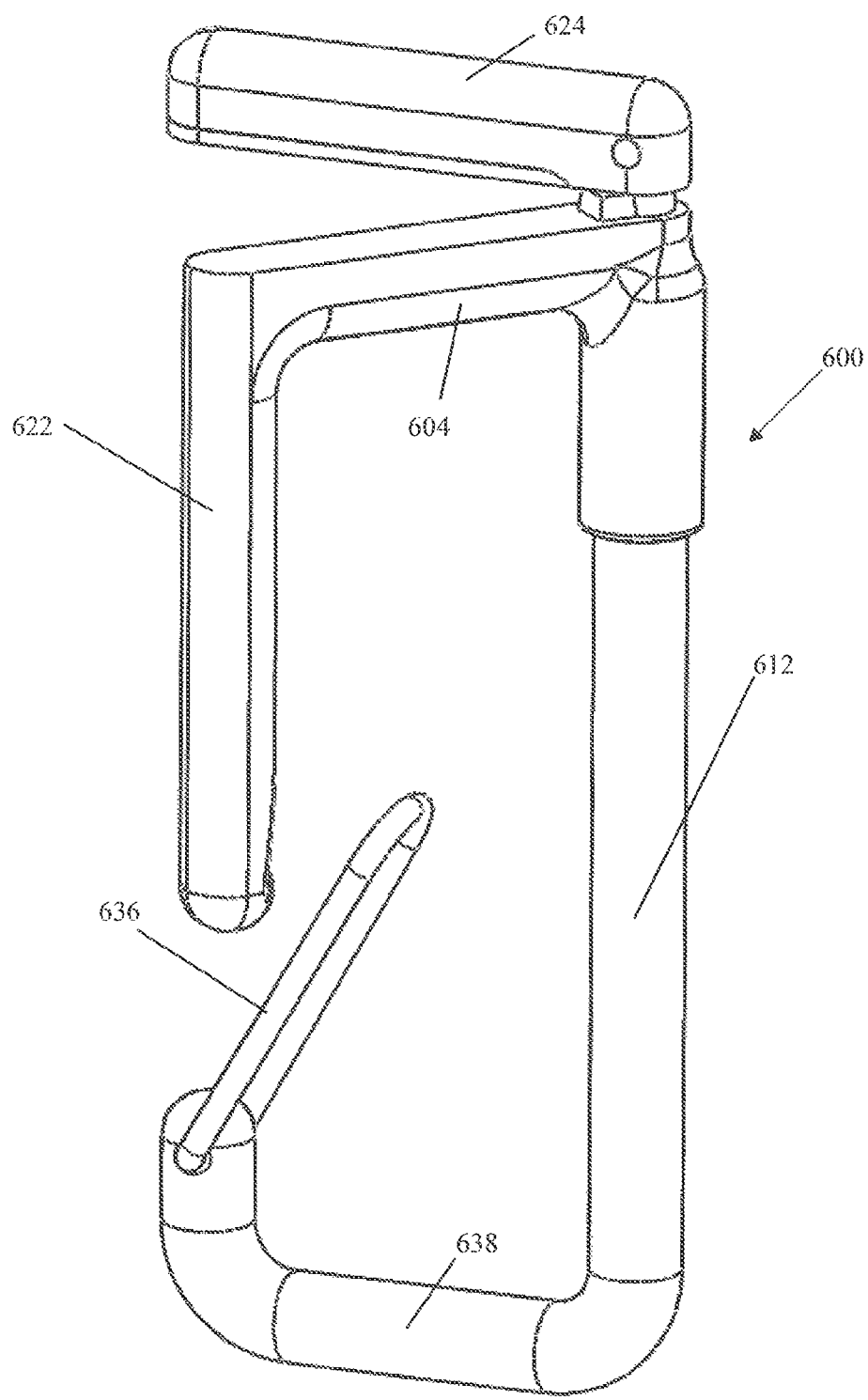
FIG. 31 is the device of FIG. 29 shown in a position that is adapted to accept a handbag.

FIGS. 29-31, show another handbag securing device 600 of one embodiment that is made out of a lightweight material that is similar to the device shown above in FIGS. 1-5. A door arm 604 includes a bore 608 for receiving a post 612 of the device 600 that is spring 616 biased. A capture hook 620 that is associated with that is associated with the door arm 604. In operation, a table arm 624 is pulled away from the door arm 604 that compresses the spring 616 and pulls a capture hook 628 upwardly. In addition, pulling the capture hook 628 upward slides an upper end 632 of a capture ring 636 associated with a primary hook 638 along an inclined portion 640 of the capture hook 620, thereby rotating the capture ring 636 as shown in FIG. 31. The table arm 624 is then able to rotate as a boss 644 associated with the door arm 604 is removed from a recess 646 of the table arm 624 as shown in FIGS. 30 and 31. The handbag would then be placed on the hook 638 to secure the same.

It is envisioned that this embodiment of the present invention be made out of plastic or semi-rigid materials. It is also envisioned that the capture ring 636 may alternatively be a carabineer type of interconnection or employ a living hinge. Furthermore, those of skill in the art will appreciate other aspects of the present invention described above may be incorporated in this invention, such as a door arm having a first portion and a second portion that are hingedly interconnected.

The handbag securing devices of embodiments of the invention can also be hung from a handbag and perhaps used to support other items. The device may, for example, receive grocery or shopping bags. Similarly, the device may be hung from a stroller or shopping cart.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A selectively foldable device for securing a handbag, comprising:
    a primary hook having a first end and a second end, said primary hook also comprising a linear portion that is interconnected to a portion adapted to receive the handbag;
    an auxiliary arm with a first portion and a second portion hingedly interconnected and spring biased to said first portion, said auxiliary arm rotatably interconnected to said linear portion of said primary hook and capable of selectively rotating about said linear portion of said primary hook;
    an extension with a first end interconnected to said second portion of said auxiliary arm and a second end;
    a head operably interconnected to said first end of said primary hook, said head having a first surface adapted to engage a horizontal surface;
    wherein in a first, folded position of use said auxiliary arm and said extension is positioned such that said second end of said extension is positioned adjacent to said second end of said primary hook; and
    wherein in a second position of use said surface of said head adapted to be engaged on a horizontal surface and said auxiliary arm and associated extension are positioned such that said second end of said primary hook and said second end of said extension are positioned away from each other so that said head may be adapted to be positioned on said horizontal surface and said second end is adapted to be positioned beneath said horizontal surface.

2. The device of claim 1, wherein said head possesses a second surface that is generally parallel to said first surface that includes a cavity for receiving at least one of a decorative in-lay, a photograph, a LED display, and a pill box.

3. The device of claim 1, wherein a portion of said primary hook that is adapted to receive the handbag is arcuate.

4. The device of claim 1, wherein said second end of said primary hook and said second end of said extension employs a spherical end member.

5. The device of claim 1, wherein said head includes a channel about a portion of an outer edge thereof, said channel able to receive a portion of said primary hook when said device in said first position of use, said head also including a groove that interfaces with a portion of said primary hook when said head is in the second position of use.

6. The device of claim 5, wherein said head is interconnected to said first end of said primary hook and spring biased wherein said head must be pulled from said portion of said primary hook to disassociate said channel from said linear portion of said primary hook to allow rotation of said head from said first position of use to said second position of use.

7. The device of claim 1, wherein said auxiliary arm includes a selectively deflectable pin that helps maintain said head in said first position of use.

8. The device of claim 7, wherein said pin is at least partially retracted within said auxiliary arm when said first portion and said second portion of said auxiliary arm are angled with respect to each other.

9. A selectively foldable device for securing a handbag, comprising:
    a primary hook having a linear portion and a hooked portion;
    an auxiliary arm with a first portion and a second portion hingedly interconnected and spring biased to said first portion, said auxiliary arm rotatably interconnected to said linear portion of said primary hook and capable of selectively rotating about said linear portion of said primary hook; and
    an extension interconnected to said second portion of said auxiliary arm, said extension having an end that selectively coincides with an end of said hooked portion; and
    a head selectively interconnected to said linear portion of said primary hook, said head having a first surface adapted to engage a horizontal surface.

10. The device of claim 9, wherein said head possesses a second surface that is generally parallel to said first surface that includes a cavity for receiving at least one of a decorative in-lay, a photograph, a LED display, and a pill box.

11. The device of claim 9, wherein a portion of said primary hook that is adapted to receive said handbag is arcuate.

12. The device of claim 9, wherein said auxiliary arm includes a selectively deflectable pin that helps maintain said head in said first position of use.

13. The device of claim 12, wherein said pin is at least partially retracted within said auxiliary arm when said first portion and said second portion of said auxiliary arm are angled with respect to each other.

14. The device of claim 9, wherein said head includes a channel about a portion of an outer edge thereof, said channel able to receive a portion of said linear portion of said primary hook, said head also including a groove that interfaces with a portion of said linear portion of said primary hook to maintain a planar surface thereof in such an orientation to be adapted to engage a horizontal surface.

15. The device of claim 14, wherein said head is interconnected to said first end of said primary hook and spring biased wherein said head must be pulled from said linear portion of said primary hook to disassociate said channel from said primary hook to allow rotation of said head.

* * * * *